United States Patent
Kikuchi et al.

(10) Patent No.: US 10,812,704 B2
(45) Date of Patent: Oct. 20, 2020

(54) FOCUS DETECTION DEVICE, METHOD AND STORAGE MEDIUM, FOR CONTROLLING IMAGE SENSOR OPERATIONS

(71) Applicant: Olympus Corporation, Hachioji-shi, Tokyo (JP)

(72) Inventors: Tetsuo Kikuchi, Hachioji (JP); Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/457,910

(22) Filed: Jun. 28, 2019

(65) Prior Publication Data
US 2020/0021744 A1   Jan. 16, 2020

(30) Foreign Application Priority Data
Jul. 13, 2018   (JP) .................................. 2018-133315

(51) Int. Cl.
*H04N 5/3745*   (2011.01)
*H04N 5/343*   (2011.01)
*H04N 5/232*   (2006.01)

(52) U.S. Cl.
CPC ... *H04N 5/232122* (2018.08); *H04N 5/23245* (2013.01); *H04N 5/232935* (2018.08); *H04N 5/343* (2013.01); *H04N 5/37457* (2013.01); *H04N 5/23287* (2013.01)

(58) Field of Classification Search
CPC ......... H04N 5/23212; H04N 5/232122; H04N 5/23245; H04N 5/23293; H04N 5/23295; H04N 5/343; H04N 5/37457
See application file for complete search history.

(56) References Cited

U.S. PATENT DOCUMENTS

| | | | |
|---|---|---|---|
| 2015/0312485 A1* | 10/2015 | Kitani | H04N 5/3696 348/221.1 |
| 2017/0155855 A1* | 6/2017 | Ito | H04N 5/23212 |
| 2018/0063416 A1* | 3/2018 | Kimoto | H04N 1/2145 |
| 2018/0077339 A1* | 3/2018 | Kameda | G02B 7/38 |
| 2019/0104261 A1* | 4/2019 | Hatakeyama | H04N 5/2254 |

FOREIGN PATENT DOCUMENTS

| | | |
|---|---|---|
| JP | 2015-005853 A | 1/2015 |
| JP | 2015-161906 A | 9/2015 |

* cited by examiner

*Primary Examiner* — Paul M Berardesca
(74) *Attorney, Agent, or Firm* — John C. Pokotylo; Pokotylo Patent Services

(57) ABSTRACT

An image sensor, comprising: a plurality of photo-diodes arranged divided in a specified pupil division direction, so that a pixel signal is generated by subjecting respective light flux, that passes through different exit pupil regions of an imaging optical systems for a single micro-lens, to photoelectric conversion, and a control circuit that implements an imaging mode for alternately and repeatedly executing a first imaging operation and a second imaging operation, wherein the first imaging operation combines pixel signals corresponding to the pupil division direction and generates and outputs a pixel signal for storage, and the second imaging operation generates and outputs a pixel signal corresponding to the pupil division direction, for focus detection.

18 Claims, 15 Drawing Sheets

FIG. 14

|     | m1  | m2  | m3  | m4  | m5  | m6  | m7  | m8  | m9  | m10 | m11 | m12 | m13 | m14 | m15 | m16 | m17 | m18 | m19 | m20 |
|-----|-----|-----|-----|-----|-----|-----|-----|-----|-----|-----|-----|-----|-----|-----|-----|-----|-----|-----|-----|-----|
| n1  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n2  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n3  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n4  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n5  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n6  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n7  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n8  | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n9  | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n10 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n11 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n12 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n13 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n14 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n15 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n16 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n17 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n18 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n19 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n20 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n21 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n22 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n23 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n24 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n25 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n26 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |
| n27 | Rl  | Rr  | Grl | Grr | Rl  | Rr  | Grl | Grr | Rl  | Rr  | Grl | Grr | Rl  | Rr  | Grl | Grr | Rl  | Rr  | Grl | Grr |
| n28 | Gbl | Gbr | Bl  | Br  | Gbl | Gbr | Bl  | Br  | Gbl | Gbr | Bl  | Br  | Gbl | Gbr | Bl  | Br  | Gbl | Gbr | Bl  | Br  |

FIG. 15

|  | L | R | L | R | L | R | L | R | L | R | L | R | L | R | L | R | L | R | L | R |
|--|---|---|---|---|---|---|---|---|---|---|---|---|---|---|---|---|---|---|---|---|
|  | m1 | m2 | m3 | m4 | m5 | m6 | m7 | m8 | m9 | m10 | m11 | m12 | m13 | m14 | m15 | m16 | m17 | m18 | m19 | m20 |
| n1, 3, 5, 7, 9 | Gr | Gr | Gr | Gr | Gr | Gr | Gr | Gr | Gr | Gr | Gr | Gr | Gr | Gr | Gr | Gr | Gr | Gr | Gr | Gr |
| n2, 4, 6, 8, 10 | Gb | Gb | Gb | Gb | Gb | Gb | Gb | Gb | Gb | Gb | Gb | Gb | Gb | Gb | Gb | Gb | Gb | Gb | Gb | Gb |
| n19, 21, 23, 25, 27 | Gr | Gr | Gr | Gr | Gr | Gr | Gr | Gr | Gr | Gr | Gr | Gr | Gr | Gr | Gr | Gr | Gr | Gr | Gr | Gr |
| n20, 22, 24, 26, 28 | Gb | Gb | Gb | Gb | Gb | Gb | Gb | Gb | Gb | Gb | Gb | Gb | Gb | Gb | Gb | Gb | Gb | Gb | Gb | Gb |

|  | L m1 | L m3 | L m5 | L m7 | L m9 | L m11 | L m13 | L m15 | L m17 | L m19 |
|---|---|---|---|---|---|---|---|---|---|---|
| n1, 3, 5, 7, 9 | Gr | Gr | Gr | Gr | Gr | Gr | Gr | Gr | Gr | Gr |
| n2, 4, 6, 8, 10 | Gb | Gb | Gb | Gb | Gb | Gb | Gb | Gb | Gb | Gb |
| n19, 21, 23, 25, 27 | Gr | Gr | Gr | Gr | Gr | Gr | Gr | Gr | Gr | Gr |
| n20, 22, 24, 26, 28 | Gb | Gb | Gb | Gb | Gb | Gb | Gb | Gb | Gb | Gb |

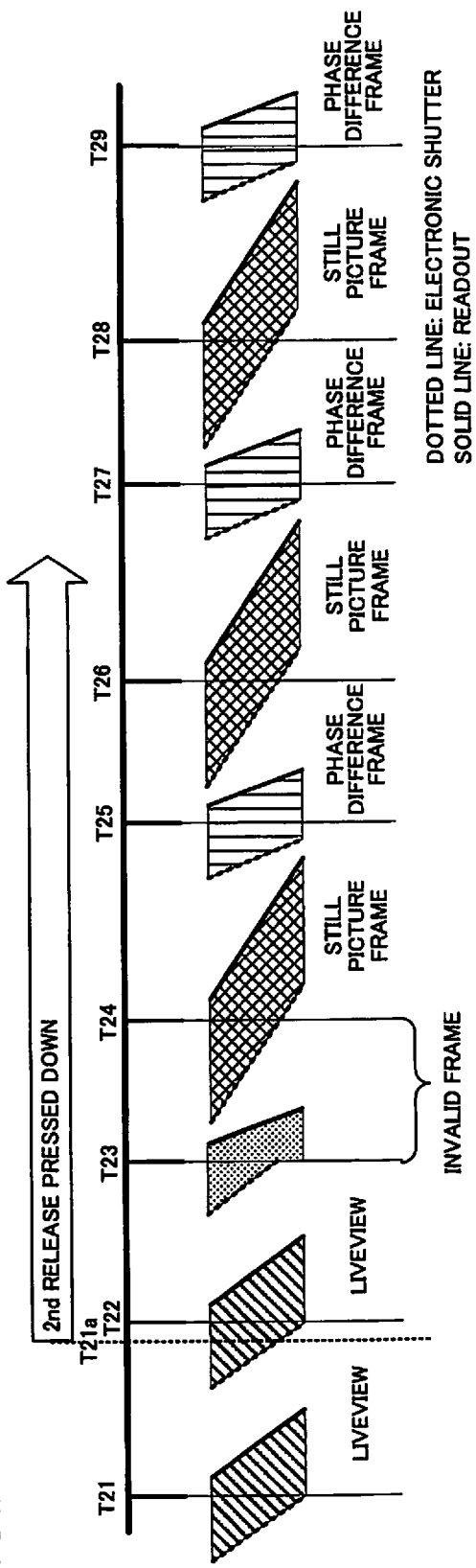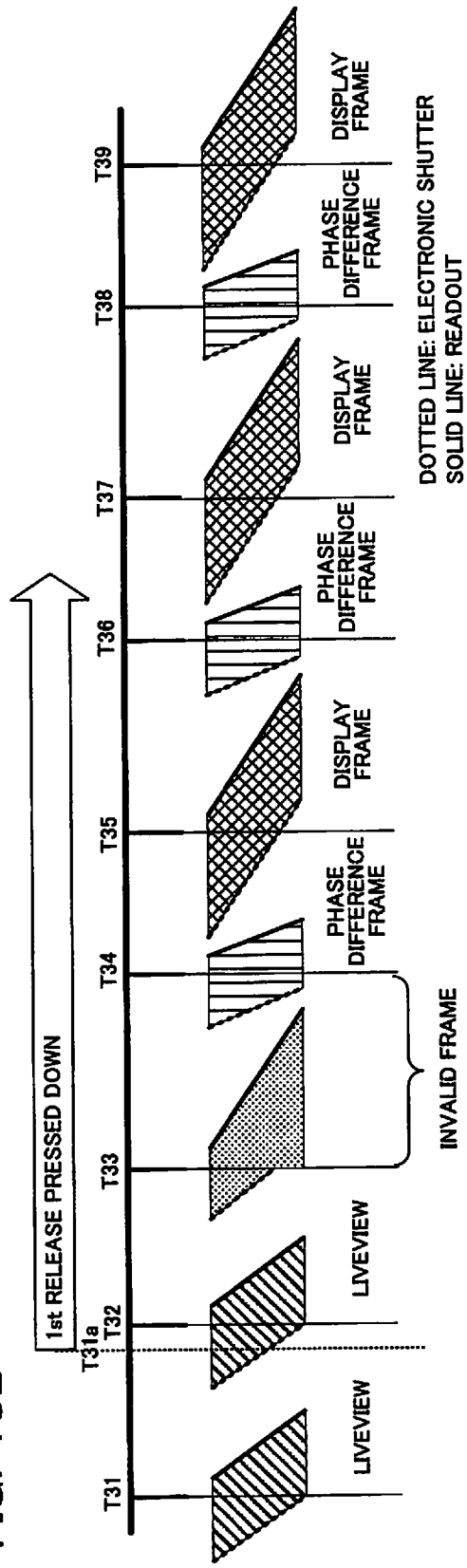

FOCUS DETECTION DEVICE, METHOD AND STORAGE MEDIUM, FOR CONTROLLING IMAGE SENSOR OPERATIONS

CROSS-REFERENCE TO RELATED APPLICATIONS

Benefit is claimed, under 35 U.S.C. § 119, to the filing date of prior Japanese Patent Application No. 2018-133315 filed on Jul. 13, 2018. This application is expressly incorporated herein by reference. The scope of the present invention is not limited to any requirements of the specific embodiments described in the application.

BACKGROUND OF THE INVENTION

1. Field of the Invention

The present invention relates to an image sensor, a focus detection method, and a storage medium, and in detail relates to an image sensor having focus detection pixels that output a pixel signal for performing focus adjustment using a phase difference AF method, and imaging pixels that output a pixel signal for live view image display and for image storage, and to a focus detection method and a storage medium.

2. Description of the Related Art

An imaging device, that has focus detection pixels arranged at some parts within a two dimensional array of imaging pixels, that forms a subject image that has been formed using a photographing optical system, and also performs focus detection for the photographing optical system using a phase difference AF method, is known. Also, this imaging device performs live view display based on output from imaging pixels, and also, if a release button is operated, generates image data for storage based on output from the imaging pixels and stores this image data in storage medium.

As was described previously, focus detection pixels are arranged between imaging pixels, which means that in the case of generating an image there is a method of excluding output of the focus detection pixels, and only selecting output of imaging pixels. For example, with the imaging device disclosed in Japanese patent laid-open No, 2015-0161906 (hereafter referred to as "patent publication 1"), a first pixel row that includes a row of focus detection pixels, and a second pixel row that includes a row of imaging pixels and does not include a row of focus detection pixels, are provided, and readout of a focus detection signal from the first pixel row, and readout of an image signal from the second pixel row, are alternately and asynchronously performed. Also, in Japanese patent laid-open No. 2015-005853 (hereafter referred to as "patent publication 2") it is proposed to switch between a method of respectively reading out divided pixels of a photodiode, and adding and reading out divided pixels of a photodiode, for every pixel row.

The technology disclosed in patent publication 1 and patent publication 2 described above are both imaging control methods with which it has been assumed that either a pixel signal is read out from focus detection pixels during live view display, or live view is performed with shooting standby in progress. At the time of continuous shooting for still picture shooting also, besides at the time of live view, it is necessary to perform switching of imaging drive mode.

In this case, since invalid frames (control period for making the timing for pixel readout and charge reset the same as for the next imaging drive mode) are required, continuous shooting speed is lowered by the extent of the invalid frames. Accordingly, the technology disclosed in the previously mentioned patent publications is not suitable for rapid continuous shooting.

SUMMARY OF THE INVENTION

The present invention provides an image sensor, focus detection device, imaging method, and focus detection method that are suitable for rapid continuous shooting of still pictures.

An image sensor of a first aspect of the present invention comprises a plurality of photo-diodes arranged divided in a specified pupil division direction, so that a pixel signal is generated by subjecting respective light flux, that passes through different exit pupil regions of an imaging optical system for a single micro-lens, to photoelectric conversion, and a control circuit that implements an imaging mode for alternately and repeatedly executing a first imaging operation and a second imaging operation, wherein the first imaging operation combines pixel signals corresponding to the pupil division direction and generates and outputs a pixel signal for storage, and the second imaging operation generates and outputs a pixel signal corresponding to the pupil division direction, for focus detection.

A focus adjustment method of a second aspect of the present invention is a focus detection method for a focus detection device having an image sensor with a plurality of photo-diodes, arranged divided in a given pupil division direction, that generate a pixel signal by subjecting respective light flux, that passes through different exit pupil regions of an imaging optical system for a single micro-lens, to photoelectric conversion, the focus adjustment method comprising: when the image sensor is executing a first imaging operation, performing processing to store still image data based on pixel signals output from the image sensor; when the image sensor is executing a second imaging operation, performing processing for focus detection based on pixel signals output from the image sensor; and setting an imaging mode, in the image sensor, for alternately and repeatedly executing the first imaging operation and the second imaging operation.

A non-transitory computer-readable medium of a third aspect of the present invention, storing a processor executable code, which when executed by at least one processor, performs a focus adjusting method, the processor being arranged within a focus detection device having an image sensor with a plurality of photo-diodes, arranged divided in a given pupil division direction, that generate a pixel signal by subjecting respective light flux, that passes through different exit pupil regions of an imaging optical system for a single micro-lens, to photoelectric conversion, the focus adjusting method comprising: when the image sensor is executing a first imaging operation, performing processing to store still image data based on pixel signals output from the image sensor; when the image sensor is executing a second imaging operation, performing processing for focus detection based on pixel signals output from the image sensor; and setting an imaging mode, in the image sensor, for alternately and repeatedly executing the first imaging operation and the second imaging operation.

BRIEF DESCRIPTION OF THE DRAWINGS

FIG. 14 is a drawing showing targets for pixel addition of the image sensor, in the imaging device of one embodiment of the present invention.

FIG. 15 is a drawing showing pixel addition results of the image sensor, in the imaging device of one embodiment of the present invention.

FIG. 18A and FIG. 18B are timing charts showing timing for readout of still picture frames and phase difference frames, in an imaging device of one embodiment of the present invention.

DETAILED DESCRIPTION OF THE PREFERRED EMBODIMENTS

An imaging device of one embodiment of the present invention will be described in the following. This imaging device has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a release operation image data is stored in a storage medium. Image data that has been stored in the storage medium can be subjected to playback display on the display section if playback mode is selected.

Also, the imaging section of the imaging device of this embodiment has focus detection pixels arranged at some parts within a two-dimensional array of imaging pixels, and a subject image that has been formed by a photographing optical system is imaged. When shooting still pictures using continuous shooting, exposure for phase difference detection is performed between one actual exposure and another actual exposure for still picture shooting (refer, for example, to FIG. 13). After completion of this exposure for phase difference detection, a signal from phase difference detection pixels (focus detection pixels) is read out (refer, for example, to S43 in FIG. 12B), correlation computation is performed or focus deviation amounts are calculated using the pixel signal that has been read out, and focusing of a focus lens is performed (refer, for example, to S45, S47 and S55 in FIG. 12B).

Figure 1:
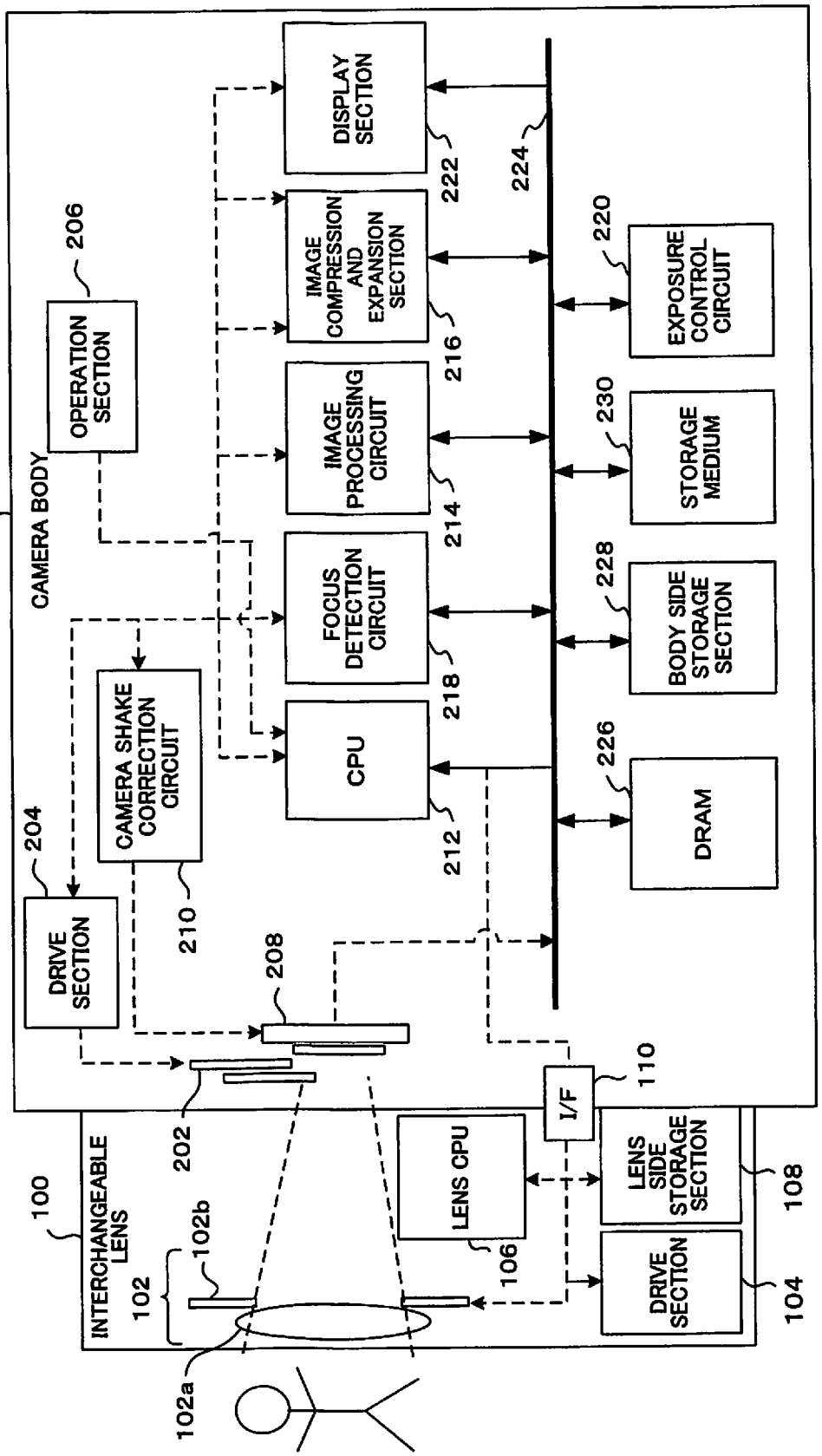
FIG. 1 is a block diagram mainly showing the electrical structure of an imaging device of one embodiment of the present invention.

FIG. 1 is a block diagram showing one example of the structure of an imaging device (specifically, a digital camera, for example) 1 that includes a focus detection device of one embodiment of the present invention. It should be noted that in FIG. 1 solid line arrows show flow of data, and dashed line arrows show flow of control signals.

An imaging device 1 comprises an interchangeable lens 100 and a camera body 200. The interchangeable lens 100 is configured so that it is possible to attach to the camera body 200. When the interchangeable lens 100 is attached to the camera body 200, the interchangeable lens 100 and the camera body 200 are connected so that communication is possible between them. It should be noted that the imaging device 1 is not necessarily a lens interchangeable imaging device. For example, the imaging device 1 may be a lens integrated imaging device. The imaging device may also be provided within a portable device, such as a smart phone.

The interchangeable lens 100 comprises an imaging optical system 102, a drive section 104, a lens CPU (Central Processing Unit) 106, and a lens side storage section (memory) 108. Here, each block of the interchangeable lens 100 is configured using hardware, for example. However, some blocks do not have to be configured using hardware, and may be configured using software. Also, each block of the interchangeable lens 100 need not be configured using a single hardware or software component, and may be configured using a plurality of hardware or software components. Also, in a case where the interchangeable lens and the camera body are integrated, the lens CPU 106 and the CPU 212 may be configured as a single CPU.

The imaging optical system 102 is an optical system for imaging light flux from a subject on to the image sensor 208 of the camera body 200. The imaging optical system 102 comprises a focus lens 102a and an aperture 102b. The focus lens 102a is constructed so as to be able to adjust focal position of the imaging optical system 102 by moving in an optical axis direction.

The aperture 102b is arranged on the optical axis of the focus lens 102a. The opening diameter of the aperture 102b is variable. The aperture 102b adjusts amount of light flux from a subject passing through the focus lens 102a that is incident on the image sensor 208. The drive section 104 has a drive motor and drive circuitry etc., and drives the focus lens 102a and the aperture 102b based on control signals output from the lens CPU 106. Here, the imaging optical system 102 may be configured as a zoom lens. In this case, the drive section 104 may also perform zoom drive. There may also be a configuration where the user drives the zoom lens manually.

The lens CPU 106 is a processor that includes a CPU and peripheral circuitry for the CPU, and operates in accordance with programs stored in a lens side storage section 108. The lens CPU 106 is configured so as to be able to communicate with the CPU 212 of the camera body 200 via an interface (I/F) 110. The lens CPU 106 controls the drive section 104 in accordance with control signals of the CPU 212 of the camera body 200. Also, the lens CPU 106 transmits various information, such as aperture value (F value) of the aperture 102b, and lens information stored in the lens side storage section 108, to the CPU 212 via the I/F 110.

It should be noted that the lens CPU 106 is not necessarily configured as a CPU. That is, functions that are the same as those of the lens CPU 106 may also be implemented using a processor such as an ASIC (Application Specific Integrated Circuit) or FPGA (Field-Programmable Gate Array) etc. Also, functions that are the same as those of the lens CPU 106 may also be implemented using software.

The lens side storage section 108 is an electrically rewritable nonvolatile memory, and stores information relating to the interchangeable lens 100. Lens information includes, for example, information focal length information and aberration information of the imaging optical system 102.

The camera body 200 comprises a mechanical shutter 202, a drive section 204, an operation section 206, the image sensor 208, a hand shake correction circuit 210, the CPU 212, an image processing circuit 214, an image compression and expansion section 216, a focus detection circuit 218, an exposure control circuit 220, a display section 222, a bus 224, DRAM (Dynamic Random Access Memory) 226, a body side storage section (memory) 228, and a storage medium 230. Here, each block of the camera body 200 is configured using hardware, for example. However, some blocks do not have to be configured using hardware, and may be configured using software. Also, each block of the camera body 200 need not be configured using a single hardware or software component, and may be configured using a plurality of hardware or software components.

The mechanical shutter 202 has an opening and closing structure, and adjusts a time for which light flux from the subject is incident on the image sensor 208 (exposure time of the image sensor 208). A focal plane shutter, for example, is adopted as the mechanical shutter 202. Besides this focal plane shutter, a lens shutter may be provided in an interchangeable lens (lens barrel side). The drive section 204 drives the mechanical shutter 202 based on control signals from the CPU 212. The drive section 204 comprises an actuator that drives the mechanical shutter 202, and drive circuitry etc. for this actuator, and performs opening and closing operations of the mechanical shutter 202.

The operation section 206 is an interface for inputting user instructions to the imaging device 1, and includes various operation members such as various operation buttons like a power supply button, a release button, a movie button, a playback button, a menu button, etc. and a touch panel etc. This operation section 206 detects operating states of the various operation members, and outputs signals representing detection results to the CPU 212.

The image sensor 208 has a pixel section 22 (refer to FIG. 2) with a plurality of imaging pixels arranged two-dimensionally. Imaging pixels are constructed divided into a plurality of focus detection pixels, corresponding to a micro-lens L (refer to FIG. 3). The focus detection pixels generate photoelectric conversion signals by respectively subjecting light flux, that passes through regions resulting from subjecting a plurality of exit pupils of an imaging lens 2, which is a photographing optical system, to pupil-division, to photoelectric conversion. A plurality of focus detection pixels are arranged two dimensionally in the pixel section 22. While the image sensor 208 is constructed as a single CMOS image sensor provided with a primary color Bayer array color filter, this structure is not limiting. The detailed structure of the image sensor 208 will be described later using FIG. 2 to FIG. 4.

The image sensor 208 is an image sensor having a plurality of photo-diodes arranged divided in a given pupil division direction, for a single micro-lens, so that a pixel signal is generated by subjecting respective light flux, that passes through different exit pupil regions of an imaging optical system, to photoelectric conversion. The image sensor 208 is also an image sensor having a pixel section in which a plurality of light receiving sections are arranged divided in a given pupil division direction, for a single micro-lens, so that a pixel signal is generated by subjecting respective light flux, that passes through different exit pupil regions of an imaging optical system, to photoelectric conversion.

The image sensor 208 is arranged on the optical axis of the imaging optical system 102, at a position that is behind the mechanical shutter 202, and where light flux from a subject is formed into an image by the imaging optical system 102. The image sensor 208 images a subject and generates a pixel signal relating to the subject.

The image sensor 208 of this embodiment is capable of operating in a focus detection pixel priority mode (simple readout system) where first readout is performed based on control of the CPU 212 functioning as a system control section, an imaging pixel priority mode (subtraction readout system) where second readout is performed, and image only mode (readout system with no phase difference information) where third readout is performed.

Taking an example where a single image pixel is divided into two focus detection pixels A and B, for example, with focus detection pixel priority mode (simple readout system) a pair of focus detection pixel signals A and B are respectively output from the image sensor 208 as a result of first readout. As pairs of focus detection pixels A and B, there are left opening pixels Gbl, Brl, Rl and Bl, and right opening pixels Gbr, Grr, Rr and Br. Also, as pairs of focus detection pixels A and B there are top-opening pixels Gbt, Grt, Rt and Bt, and bottom-opening pixels Gbb, Grb, Rb and Gb Also, with image pixel priority mode (subtractive readout system), one of either of the pair of focus detection pixel signals A and B (here, for example, it is made the focus detection pixel signal A), and an image pixel signal (A+B) resulting from addition of the pair of focus detection pixel signals A and B, are output from the image sensor 208 using second readout. Further, in image only mode (readout system without phase difference information), only an image pixel signal (A+B) resulting from having added a pair of focus detection pixel signals A and B is output using third readout, and neither of the focus detection pixel signals A and B are output. Detailed operation of the first readout, second readout, and third readout will be described later using FIG. 5 to FIG. 11.

Figure 5:
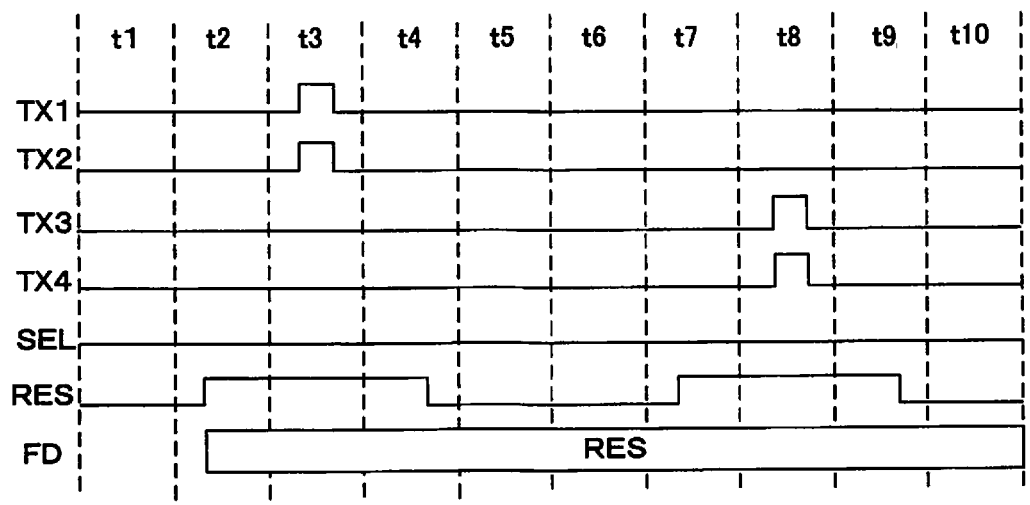
FIG. 5 is a timing chart showing an operational example of an image sensor when performing an electronic shutter operation at the time of focus detection pixels priority mode, in the imaging device of one embodiment of the present invention.
Figure 6:
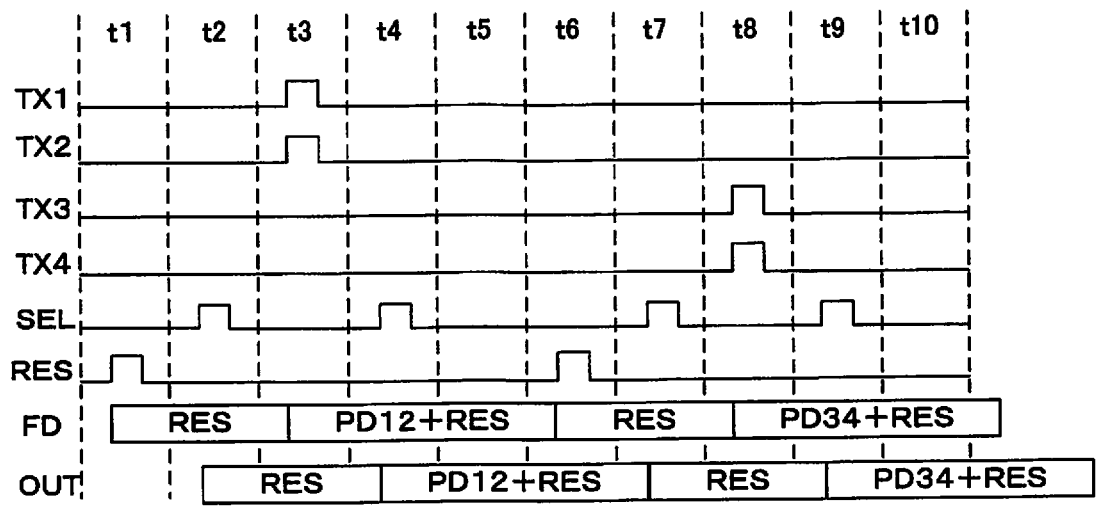
FIG. 6 is a timing chart showing an operational example of an image sensor when performing pixel signal readout at the time of focus detection pixels priority mode, in the imaging device of one embodiment of the present invention.

The image sensor 208 operates under a first imaging operation where pixel signals corresponding to pupil-division direction are combined to generate and output a pixel signal for storage (refer, for example, to the third readout shown in FIG. 10 and FIG. 11), and under a second imaging operation where pixel signals corresponding to pupil-division for focus detection are generated and output (refer, for example, to the first readout shown in FIG. 5 and FIG. 6). Also, the image sensor 208 (CPU 212) functions as a control circuit that executes an imaging mode to alternately and repeatedly execute a first imaging operation and a second imaging operation (refer, for example, to FIG. 13, which will be described later). The CPU 212 also functions as a control circuit that sets an imaging mode, to alternately and repeatedly execute the first imaging operation and the second imaging operation, in the image sensor. It should be noted that the control circuit may be constructed within the same chip integrally with the pixel section 22 (refer to FIG. 2) within the image sensor 208, may be provided within a separate chip to the image sensor 208, and further some of the functions of the control circuit may be implemented by the CPU 212.

Figure 7:
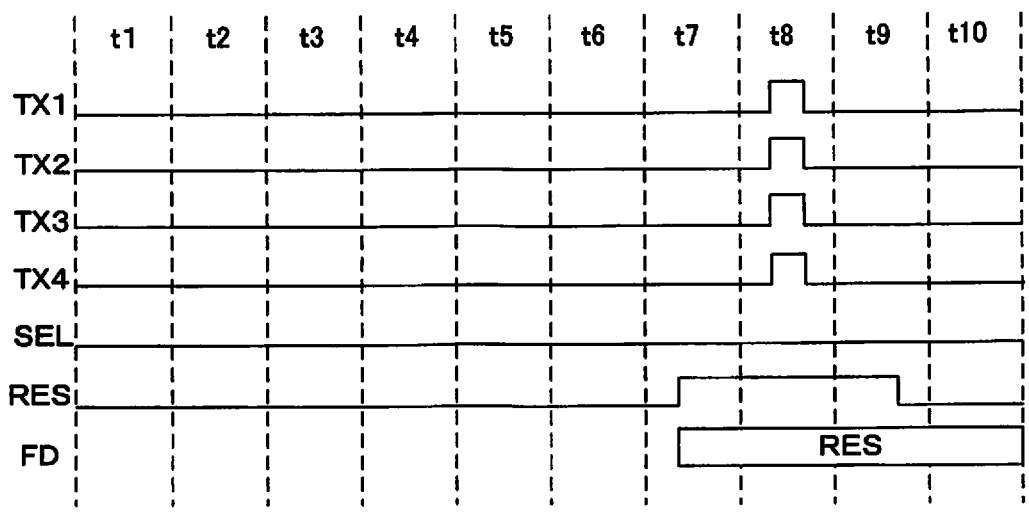
FIG. 7 is a timing chart showing a first operational example of an image sensor when performing an electronic shutter operation at the time of imaging pixels priority mode, in the imaging device of one embodiment of the present invention.
Figure 8:
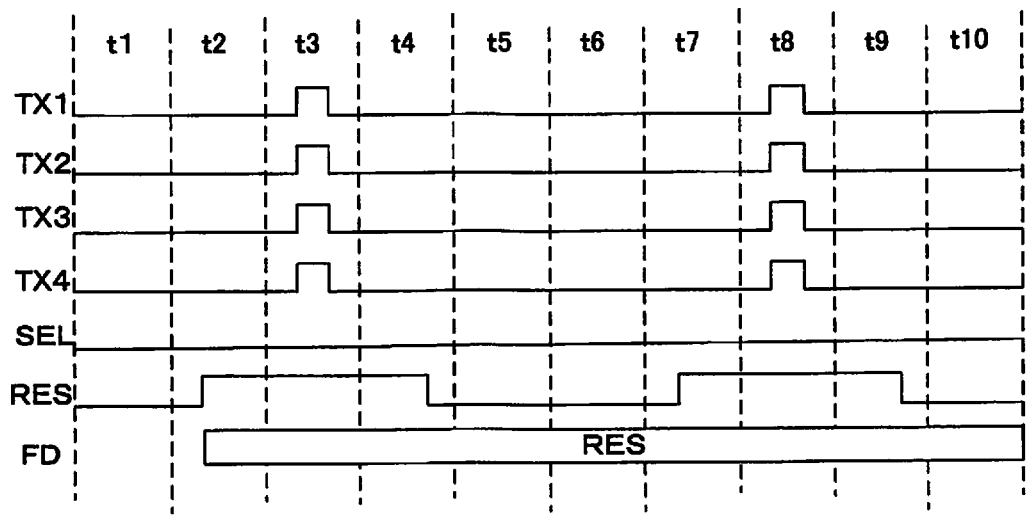
FIG. 8 is a timing chart showing a second operational example of an image sensor when performing an electronic shutter operation at the time of imaging pixels priority mode, in the imaging device of one embodiment of the present invention.
Figure 9:
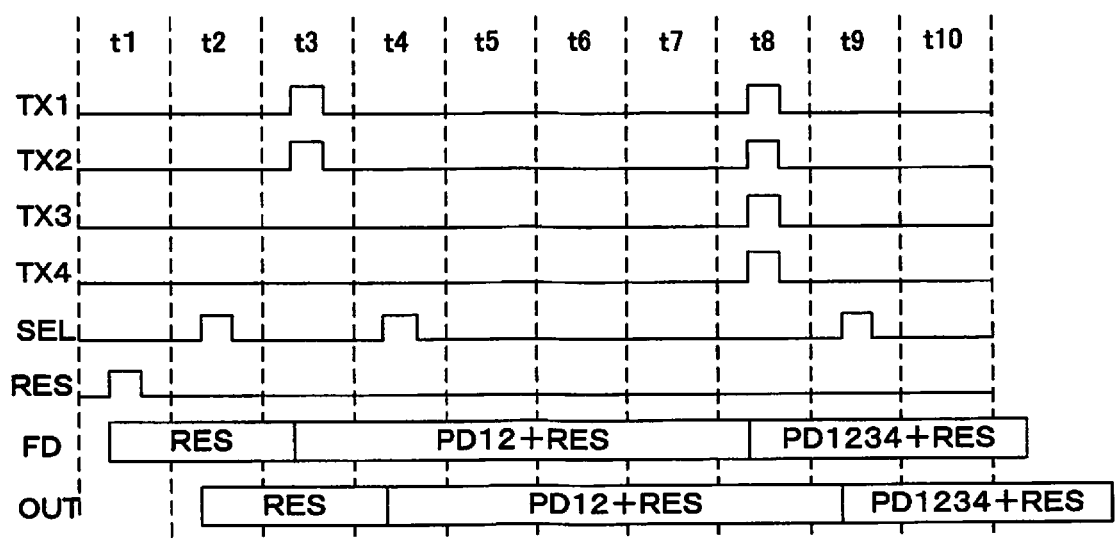
FIG. 9 is a timing chart showing an operational example of an image sensor when performing pixel signal readout at the time of imaging pixels priority mode, in the imaging device of one embodiment of the present invention.
Figures 16, 17:
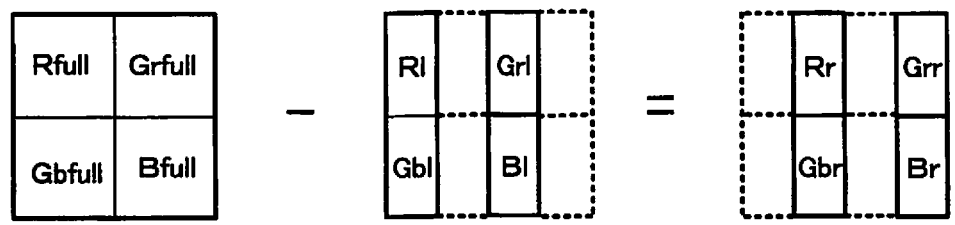
FIG. 16 is a drawing showing another example of readout from the image sensor, in the imaging device of one embodiment of the present invention.
FIG. 17 is a drawing showing another example of pixel addition results of the image sensor, in the imaging device of one embodiment of the present invention.

Also, with the above described second imaging operation, only pixel signals corresponding to some pupil-division directions of the plurality of photodiodes are output (refer, for example, to the second readout shown in FIG. 7 to FIG. 9, and to FIG. 14, FIG. 16, and FIG. 17). Also, with the above described second imaging operation, all pixel signals corresponding to the pupil-division direction of the plurality of photodiodes are output (refer, for example, to the first readout shown in FIG. 5 to FIG. 6, FIG. 14 and FIG. 15). Also, with the image sensor 208, the image sensor has a plurality of imaging modes, and among the plurality of imaging modes, in the case where an imaging mode that alternately and repeatedly executes the first imaging operation and the second imaging operation is set, the first imaging operation is executed before the second imaging operation (refer, for example, to FIG. 18A).

Figure 12A:
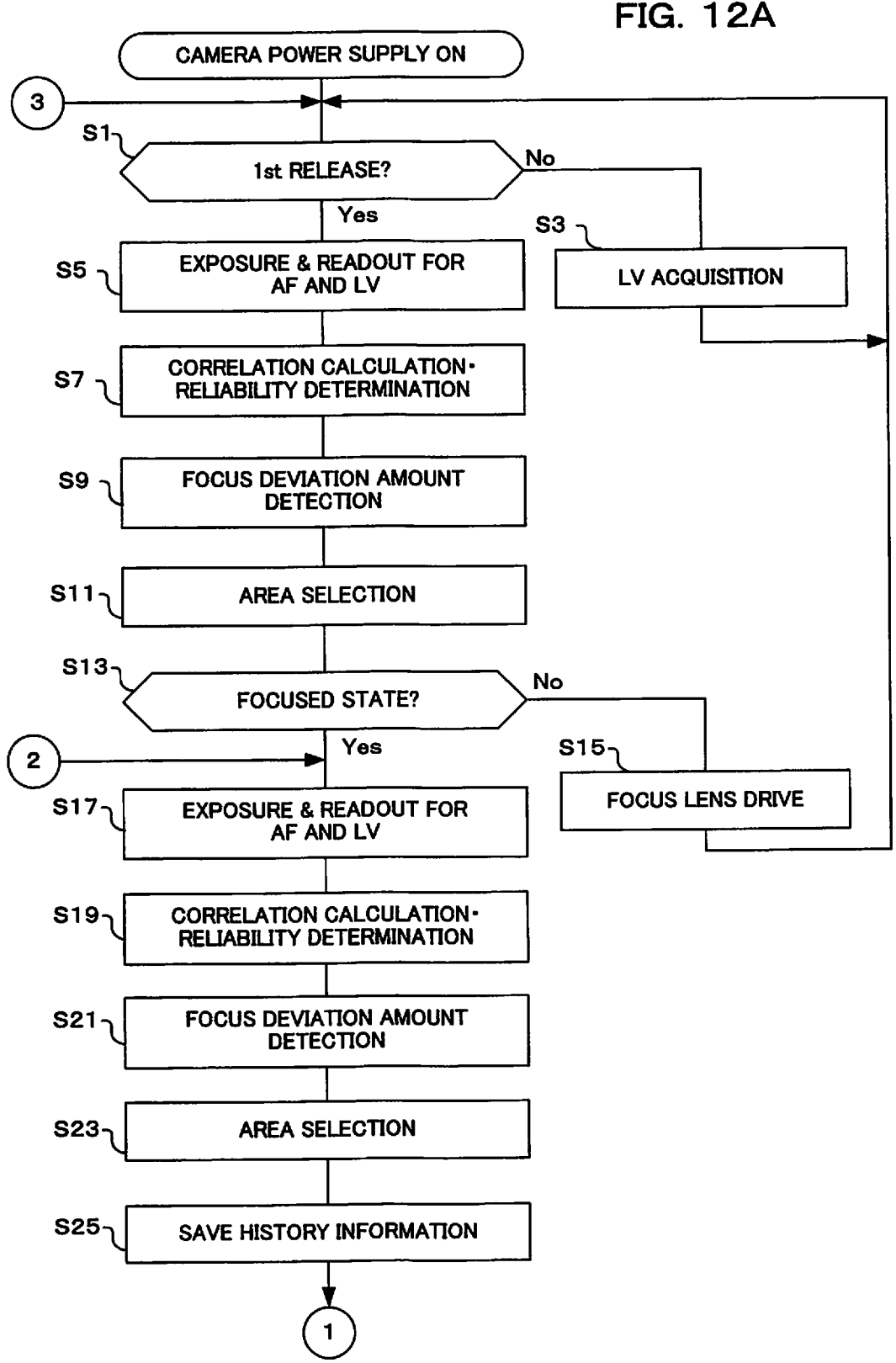
FIG. 12A and FIG. 12B are flowcharts showing operation of an imaging device of one embodiment of the present invention.

The image sensor includes a second imaging mode where a third imaging operation is performed to combine pixel signals corresponding to pupil division direction, and generate and output a pixel signal for display (refer, for example, to second readout in FIG. 7 to FIG. 9, and S5 in FIG. 12A). The CPU 212 (and image sensor 208) functions as a control circuit that, if still picture shooting has been instructed in a case where the image sensor is repeatedly executing imaging operations in the second imaging mode, sets an imaging mode to alternately and repeatedly execute the first imaging operation and the second imaging operation in the image sensor (refer, for example, to S31 and S43 in FIG. 12B).

The image sensor includes a third imaging mode where the second imaging operation and the third imaging operation are successively executed (refer, for example, to S5 and S17 in FIG. 12A). The CPU 212 functions as a control circuit that, if still picture shooting has been instructed in a case where the image sensor is repeatedly executing imaging operations in the third imaging mode, sets an imaging mode to alternately and repeatedly execute the first imaging operation and the second imaging operation in the image sensor (refer, for example, to FIG. 12A and S31 and S43 in FIG. 12B).

The hand shake correction circuit 210 moves the image sensor 208 in directions parallel to the light receiving surface of the image sensor, so as to suppress camera shake that has been generated in the camera body 200. By moving the image sensor 208 so as to negate camera shake movement, blurring of the subject image occurring in image data that is attributable to camera shake is suppressed. It should be noted that the camera shake correction circuit may be provided in the interchangeable lens 100. A camera shake correction circuit in this case is configured so as to move a camera shake correction optical system that is included in the imaging optical system 102.

The CPU 212 is a processor that includes a CPU and peripheral circuitry for the CPU, and performs overall control of the camera body 200 in accordance with programs stored in a body side storage section 228. The CPU 212 controls imaging operations (imaging drive mode, readout mode etc.) by the image sensor 208, for example. Also, the CPU 212 outputs control signals, for driving the focus lens 102a, to the lens CPU 106, in accordance with focus state of the focus lens 102a that has been detected by the focus detection circuit 218. The CPU 212 also outputs exposure setting values that have been calculated by the exposure control circuit 220 to the lens CPU 106 and the image sensor 208. Here, the CPU 212 is not necessarily configured as a CPU. Specifically, functions that are the same as those of the CPU 212 may also be implemented using an ASIC or FPGA etc. Also, functions that are the same as those of the CPU 212 may also be implemented using software.

The image processing circuit 214 applies various image processing to pixel data. For example, at the time of still picture shooting, the image processing circuit 214 applies image processing for still picture storage to pixel data to generate still picture data. Similarly, at the time of movie shooting, the image processing circuit 214 applies image processing for movie storage to pixel data to generate movie data. Further, at the time of live view display the image processing circuit 214 applies image processing for display to the pixel data to generate display image data. The image processing circuit 214 functions as an image processing circuit that, when the image sensor is executing the first imaging operation (refer, for example, to third readout shown in FIG. 10 and FIG. 11), performs processing for storing still picture data based on pixel signals output from the image sensor.

The image compression and expansion section 216 has an image compression circuit and an image expansion circuit. At the time of image data storage, the image compression and expansion section 216 compresses image data that has been generated by the image processing circuit 214 (still picture data or movie data). Also, at the time of image data playback, image data that is stored in the storage medium 230 in a compressed state is expanded.

The focus detection circuit 218 performs focus detection for the focus lens 102a using a known phase difference method that uses focus detection pixel data output from the focus detection pixels of the image sensor 208 (refer, for example, to S7, S9 S19 and S21 in FIG. 12A, and S45 and S47 in FIG. 12B, etc., which will be described later). The focus detection circuit 218 functions as a focus detection circuit that, when the image sensor is executing the second imaging operation (refer, for example, to first readout shown in FIG. 5 and FIG. 6), performs processing for focus detection based on pixel signals output from the image sensor.

The exposure control circuit 220 fulfills a function as a photometry section, and calculates exposure setting values based on pixel data of the image sensor 208. This exposure control circuit 220 measures subject brightness from pixel data of the image sensor 208, and calculates exposure setting values necessary to make brightness of the subject at the time of shooting a correct value, from the subject brightness that has been measured. Exposure setting values include opening amount of the aperture 102b (aperture value) and exposure time of the image sensor 208 (shooter speed).

The display section 222 has a display such as a liquid crystal display or an organic EL display, and is arranged on a rear surface etc. of the camera body 200, and functions as an electronic viewfinder. This display section 222 displays images in accordance with control by the CPU 212. The display section 222 is used in live view display and display of already stored images etc.

The bus 224 is connected to the image sensor 208, CPU 212, image processing circuit 214, image compression and expansion section 216, focus detection circuit 218, exposure control circuit 220, display section 222, DRAM 226, body side storage section 228 and storage medium 230, and operates as a transfer circuit for transferring various data that has been generated by these blocks.

The DRAM 226 is an electrically rewritable volatile memory, and temporarily stores various data such as pixel data output from the image sensor 208, still picture data, movie data, display image data, and process data for the CPU 212 etc. It should be noted that it is also possible to use an SDRAM (synchronous dynamic random access memory) as temporary storage.

The body side storage section 228 is an electrically rewritable non-volatile memory. The body side storage section 228 stores various data such as programs used by the CPU 212 and adjustment values for the camera body 200 etc. The storage medium 230 is an electrically rewritable non-volatile memory, and is built into the camera body 200 or configured to be loaded into the camera body 200. The storage medium 230 stores image data for storage as an image file of a specified format. It should be noted that the DRAM 226, body side storage section 228, and storage medium 230 may be respectively configured as a single memory, or may be configured as a combination of a plurality of memories etc.

Next, the structure of the image sensor 208 will be described using FIG. 2. The image sensor 208 has imaging pixels that have been divided into a plurality of focus detection pixels, and generates image pixel signal and focus detection pixel signals based on photoelectric conversion signals that have been generated by subjecting light flux from focus detection pixels to photoelectric conversion.

Figure 2:
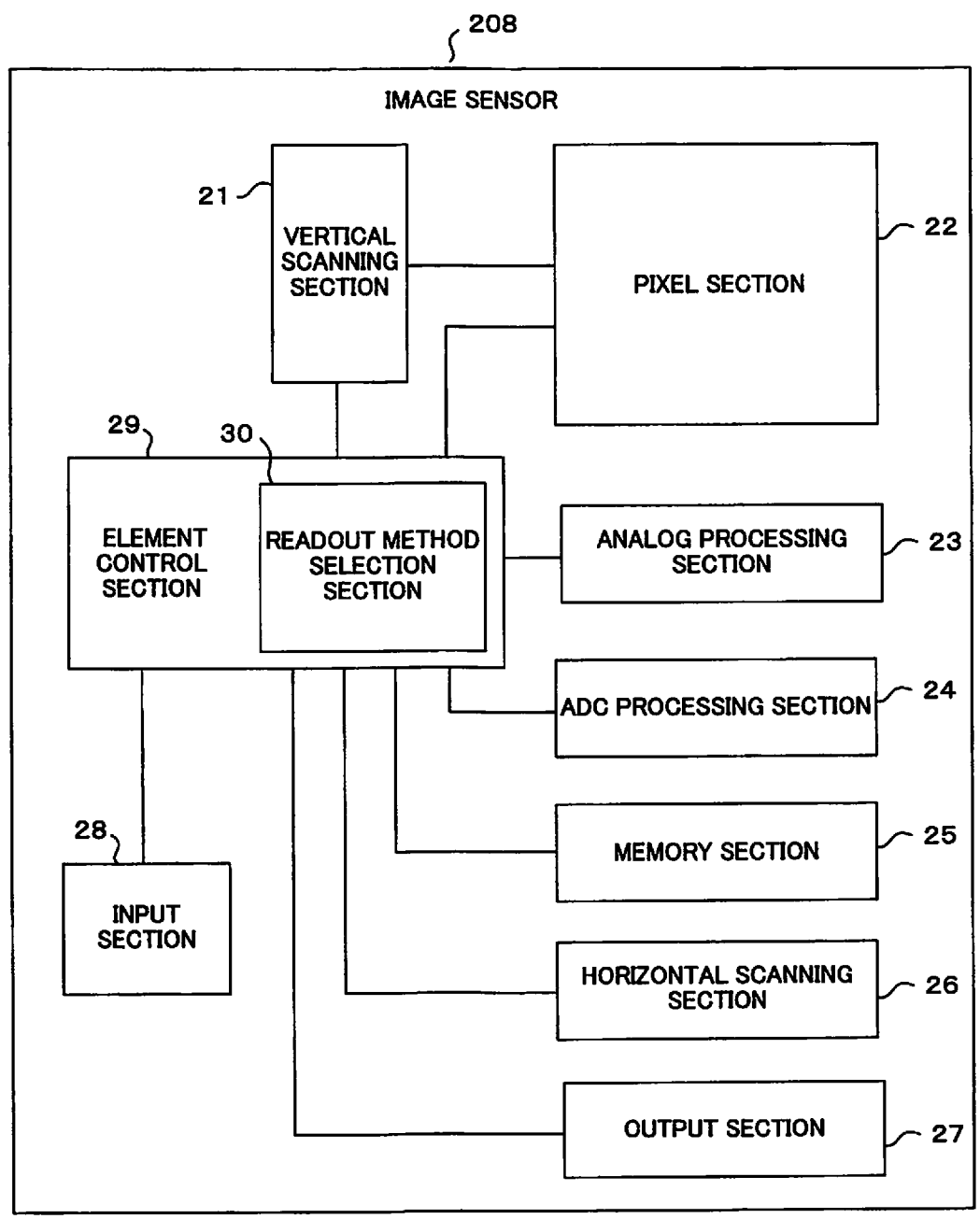
FIG. 2 is a block diagram mainly showing the electrical structure of an image sensor of an imaging device of one embodiment of the present invention.

In the example shown in FIG. 2, the image sensor 208 comprises a vertical scanning section 21, a pixel section 22, an analog processing section 23, an ADC processing section 24, memory section 25, horizontal scanning section 26, output section 27, input section 28, and element control section 29.

Image pixels and a focus detection pixels are arranged in the pixel section 22. Generation of the image pixel signals and focus detection pixel signals by photoelectric conversion is performed by at least one section among the vertical scanning section 21 to output section 27, and the element control section 29 etc. The structure of each pixel arranged in the pixel section 22 will be described later using FIG. 3. Also, electrical connections of the image pixels and the focus detection pixels will be described later using FIG. 4.

The vertical scanning section 21 has a vertical scanning circuit, and performs scanning in a vertical direction by successively selecting pixel rows (lines) in a horizontal direction within the pixel section 22. This vertical scanning section 21 selects a particular line, and controls charge accumulation time of pixels (exposure time) by performing resetting and transfer of each pixel of the line that has been selected.

The analog processing section 23 has an analog processing circuit, and subjects an analog pixel signal that has been read out from the pixel section 22 to analog signal processing. This analog processing section 23 includes, for example, a preamp that amplifies the pixel signal, and a correlated double sampling (CDS) circuit that subtracts reset noise from the pixel signal, etc.

The analog digital conversion processing section (ADC processing section) 24 has an A/D conversion circuit, and converts the analog pixel signal that has been output from the analog processing section 23 to a digital pixel signal. This ADC processing section 24 adopts a structure, such as exemplified by camera ADC, for example, whereby a pixel signal that has been read out from the pixel section 22 is subjected to AD conversion by an analog to digital converter (ADC) for every line.

The memory section 25 has a memory, and is configured by an electrically rewritable volatile memory circuit etc. that temporarily holds a pixel signal that has been converted by the ADC processing section 24.

The horizontal scanning section 26 has a horizontal scanning circuit, and reads out pixel signals (image pixel signals and focus detection pixel signals) from the memory section 25 in the order of columns.

The output section 27 has an output circuit, and organizes pixel signals that have been read out from the horizontal scanning section 26 for generating pixel signal rows, converts to an output signal format such as a serial signal or differential signal etc. and outputs the converted result. It should be noted that this output section 27 or the above described ADC processing section 24 etc. function as a sensitization section that performs sensitization processing (signal amplification processing in accordance with ISO sensitivity that has been set).

The input section 28 has an input circuit, and receives synchronization signals, a reference clock and operation setting information etc. relating to control of the image sensor 208 from a system control section 14.

The element control section 29 has an imaging control circuit, and is for controlling each block within the image sensor 208 in conformity with synchronization signals and a reference clock that have been received via the input section 28, and is provided with a readout method selection section 30. Also, the element control section 29 receives operation setting commands, such as commands for switching imaging drive mode, from the CPU 212 via the input section 28, and controls each block within the image sensor 208.

The readout method selection section 30 has a selection circuit, and selects and sets a readout method for readout from the image sensor 208 based on operation setting information (for example, camera modes such as still picture shooting, movie shooting, live view, AF etc.) that has been received via the input section 28. As readout methods, first readout (simple readout system), second readout (subtraction readout system), and third readout (readout system without phase difference information) etc. are provided. The element control section 29 controls each section within the image sensor 208 in accordance with a readout method that has been set by the readout method selection section 30.

A control section that controls readout of the image sensor is configured by the element control section 29 and the CPU 212 that was shown in FIG. 1. The control section controls the image sensor 208 service to perform first readout in a given frame, and perform second readout in another given frame. Also, the control section controls the image sensor 208 so as to perform third readout in yet another given frame. Also, the element control section 29 has a predetermined priority of imaging drive modes, and for each single frame it is possible to execute an imaging drive mode where any one of the first, second, or third readout are executed, an imaging drive mode where a combination of a plurality of readouts are executed, and further an imaging drive mode where those operations are repeatedly executed etc. For example, as will be described later, there are an imaging drive mode where still picture frames (third readout) and phase difference frames (first readout) continue to be executed alternatively and repeatedly, and an imaging drive mode where live view (display) frames (third readout) continue to be executed repeatedly. In this way, the image sensor 208 is capable of executing imaging operations in accordance with an imaging drive mode that has been instructed from the CPU 212.

First readout is generation and readout of both of a pair of focus detection pixel signals for a first pupil-division direction, based on the photoelectric conversion signal. Also, second readout is generation of one of a pair of focus detection pixel signals for a second pupil-division direction based on a photoelectric conversion signal, together with generation of an image pixel signal by addition of all photoelectric conversion signals that have been generated within a single image pixel, and reading out the one focus detection pixel signal that has been generated and the image pixel signal. Further, the third readout is generation of an image pixel signal by addition of all photoelectric conversion signals that have been generated within a single image pixel, and reading out the image pixel signal that has been generated.

It should be noted that in FIG. 2 a structural example is shown in which the image sensor 208 is not only provided with the vertical scanning section 21 and the pixel section 22, but is also provided with the analog processing section 23—element control section 29. However, the structure of the image sensor 208 is not thus limited, and it is possible for one or more of the analog processing section 23—element control section 29, for example, to be arranged externally to the image sensor 208.

Next, the structure of the focus detection pixels and image pixels arranged in the pixel section 22 will be described using FIG. 3. As has been described above, the pixel section 22 is a pixel array section having image pixels and focus detection pixels arranged two dimensionally (for example, in the vertical direction (column direction) and horizontal direction (line direction)).

Figure 3:
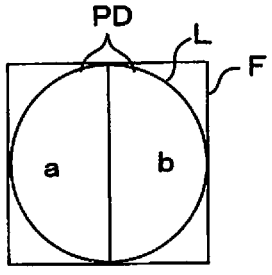
FIG. 3 is a block diagram showing the structure of pixels of an imaging device relating to one embodiment of the present invention.

FIG. 3 is a table showing an example of a pixel structure in which two or four photodiodes PD are arranged in a single microlens L. In FIG. 3, a 2PD pixel structure and a 4PD pixel structure are exemplified as structures for the image pixels. The 2PD pixel structure has two photodiodes PD arranged for a single microlens L. The 4PD pixel structure has four photodiodes PD arranged for a single microlens L.

Each pixel is configured with a microlens L, color filter F and photodiode PD arranged sequentially in a lamination direction from an object side to an imaging surface. Here, the microlens L is for increasing light amount reaching the image pixels by concentrating light, and effectively making a numerical aperture of the image pixels large. Also, regarding the color filter F, in a case, for example, of a primary color Bayer array color filter, either of an R filter, G filter or B filter is provided in accordance with that pixel position.

In a case of the 2PD pixel structure shown in FIG. 3, two photodiodes PD are arranged in the imaging range of a single microlens L. Two photodiodes PD are divided into left and right in the case where phase difference in the horizontal direction is detected, and divided into top and bottom in the case where phase difference in the vertical direction is detected. As a result, a single pixel has two focus detection pixels a and b.

On the other hand, in a case of the 4PD pixel structure shown in FIG. 3, four photodiodes PD are arranged in the imaging range of a single microlens L. The four photodiodes PD are divided into four, namely left, right, top, and bottom, so that it is possible to detect phase difference in the horizontal direction and in the vertical direction. Specifically, the four photo diodes PD are respectively arranged at upper left, lower left, upper right, and lower right positions. As a result, a single pixel has four focus detection pixels a, b, c and d.

Also, as was described above, description will be given taking an example where all pixels of the image sensor 208 have the 4PD pixel structure. However, this does not mean that some pixels of the image sensor 208 can be prevented from having a 4PD pixel structure or a 2PD pixel structure. In the event that all pixels of the image sensor 208 have the 4PD pixel structure, a pixel signal output from each photodiode PD is a focus detection pixel signal.

Figure 4:
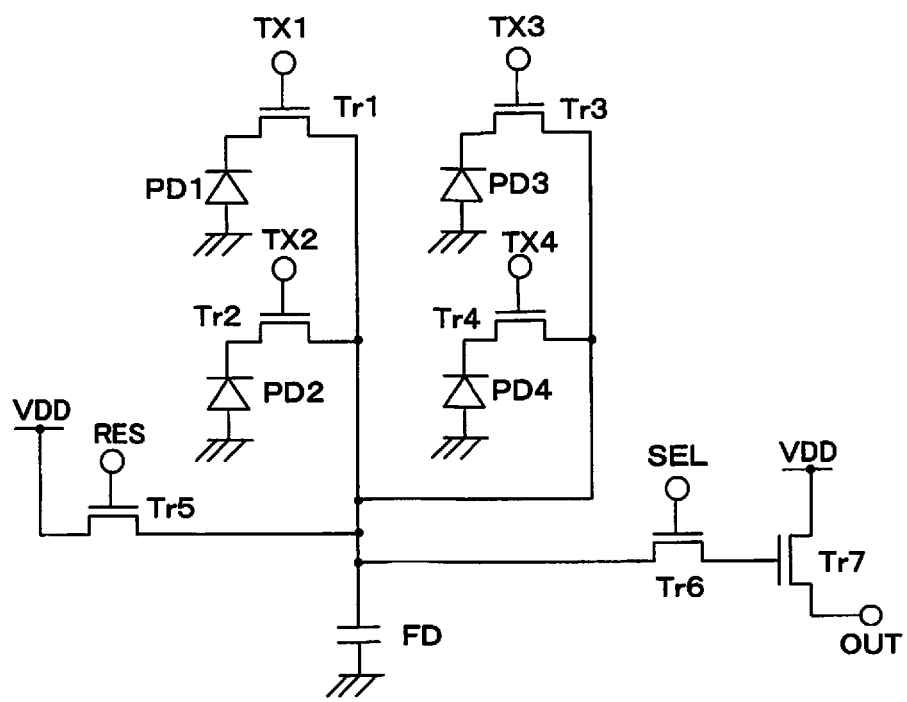
FIG. 4 is a circuit diagram showing the electrical structure of a pixel of the imaging device of one embodiment of the present invention.

Further, in a case where outputs of photodiodes PD are subjected to vertical two pixel addition using the circuit structure of FIG. 4, which will be described later, namely, in a case where (a+b) and (c+d) in FIG. 3 are calculated, the output pixel signals constitute focus detection pixel signals for detecting phase difference in the horizontal direction (vertical line detection). In a case where outputs of photodiodes PD are similarly subjected to horizontal two pixel addition, namely when (a+c) and (b+d) in FIG. 3 are calculated, pixel signals constitute focus detection pixel signals for detecting phase difference in the vertical direction (horizontal line detection).

In the case of the 4PD pixel structure shown in FIG. 3, of the focus detection pixel signals for vertical line detection and the focus detection pixel signals for horizontal line detection, one pair constitute a pair of focus detection pixel signals for a first pupil-division direction, and the other pair constitute a pair of focus detection pixel signals for a second pupil-division direction. Further, in a case where outputs of photodiodes PD are similarly subjected to four pixel addition, namely in the case where (a+b+c+d) in FIG. 3 is calculated, this four pixel addition signal constitutes an image pixel signal.

Next, a structural example of a pixel of the 4PD pixel structure will be described using the circuit diagram shown in FIG. 4.

For a pixel of the 4PD pixel structure, as was shown in FIG. 3, four photodiodes PD1-PD4 are arranged at positions corresponding to a single microlens L. Specifically, four photodiodes PD1-PD4 are respectively arranged at upper left, lower left, upper right, and lower right positions within a range of the microlens L in which an optical image is formed.

Transistors Tr1-Tr4 that function as switches are respectively connected to the four photodiodes PD1-PD4. If control signals TX1-TX4 from the vertical scanning section 21 are respectively applied to the transistors Tr1-Tr4, on-off states of the transistors Tr1-Tr4 are respectively controlled.

Each transistor Tr1-Tr4 is connected to a floating diffusion FD. This means that if a transistor is turned on, signal charge of a photodiode PD corresponding to the transistor TR is transferred to the floating diffusion FD.

Also, one end of a transistor Tr5 that functions as a switch is connected between each transistor Tr1-Tr4 and the floating diffusion FD, with the other end of the transistor Tr5 being connected to a power supply voltage VDD. By applying a reset signal RES to transistor Tr5, on off states for the power supply voltage VDD side and the floating diffusion FD side are controlled. With this structure, if the transistor Tr5 is turned on, the floating diffusion FD is reset. Also, by turning the transistor Tr5 on in a state where the transistors Tr1-Tr4 are turned on, the photodiodes PD1-PD4 are reset.

The floating diffusion FD is connected to an output terminal OUT via a transistor Tr6 that functions as a switch, and transistor Tr7 that is connected to the power supply voltage VDD and functions as an amplifier. If a selection signal SEL is applied to the transistor Tr6, a voltage value of the floating diffusion FD is amplified by transistor Tr7, and read out from the output terminal OUT.

Next, operation for first readout (focus detection pixels priority mode) will be described using the timing charts shown in FIG. 5 and FIG. 6.

FIG. 5 is a timing chart showing an operational example of an image sensor 208 when performing an electronic shutter operation at the time of focus detection pixels priority mode. It should be noted that times T1-T10 in FIG. 5, (and in FIG. 6-FIG. 11 which will be described later) represent times within the context of a single timing chart, and even if the same reference numerals (for example t1) that show times are described in different timing charts, they do not represent the same time. Also, the electronic shutter performs exposure time control for the image sensor 208 as a result of transistors within the image sensor 208 being controlled.

At time t2, if the reset signal RES is turned on (transistors Tr1-Tr6, that function as switches, are turned off apart from those that have been specifically stated as being on. The same applies in the following.) the floating diffusion FD is reset. This reset signal RES remains on until the reset SIGNAL RES is turned off at time t4.

At time t3, if control signals TX1 and TX2 are turned on then since at this point in time the reset signal RES is on signal charge of the photodiodes PD1 and PD2 is reset.

After the reset signal RES has been turned off at time t4, if the reset signal RES is turned on at time t7 the floating diffusion FD is reset again. This reset signal RES remains on until the reset SIGNAL RES is turned off at time t9.

At time t8, if control signals TX3 and TX4 are turned on, then since at this point in time the reset signal RES is on, signal charge of the photodiodes PD3 and PD4 is reset.

Also, with this flow shown in FIG. 5, since there is no charge transfer from the photodiodes PD1-PD4 to the floating diffusion FD, the floating diffusion FD holds a reset charge (labeled RES in the timing chart) from time t2 onwards.

FIG. 6 is a timing chart showing an operational example of an image sensor 208 when performing pixel signal readout at the time of focus detection pixels priority mode. FIG. 6 shows a readout operation of a pixel signal performed after the exposure time (corresponding to so-called shutter speed) has elapsed from the electronic shutter operation that was shown in FIG. 5.

At time t1, if the reset signal RES is turned on then the floating diffusion FD is reset. As a result of this reset, the floating diffusion FD holds a reset charge (RES). At time t2, if the select signal SEL is turned on, a voltage of the reset charge (RES) that has accumulated in the floating diffusion FD is amplified by the transistor Tr7 and read out from the output terminal OUT.

At time t3, if the control signals TX1 and TX2 are turned on then signal charge of photodiode PD1 (this signal charge is made PD1) and the signal charge of photodiode PD2 (this signal charge is made PD2) are transferred to the floating diffusion FD. As a result, the floating diffusion FD holds a charge (PD12+RES (it should be noted that PD12=PD1+PD2)).

At time t4, if the select signal SEL is turned on, voltage of the charge (PD12+RES) that has accumulated in the floating diffusion FD is read out from the output terminal OUT, as described above. A reset voltage (reset noise) corresponding to reset charge (RES) that is included in this voltage that has been read out at time t4 is removed, by a CDS circuit of the analog processing section 23, using a reset voltage that was read out at time t2, and it is made possible to obtain a signal voltage corresponding to the charge (PD12). After that, although description is omitted, reset noise is similarly removed and only a signal component is detected.

After that, at time t6, if the reset signal RES is turned on then the floating diffusion FD is reset. The floating diffusion FD then holds a reset charge (RES). At time t7, if the select signal SEL is turned on, a voltage of the reset charge (RES) that has accumulated in the floating diffusion FD is read out from the output terminal OUT.

At time t8, if the control signals TX3 and TX4 are turned on, then signal charge of photodiode PD3 (this signal charge is made PD3) and the signal charge of photodiode PD4 (this signal charge is made PD4) are transferred to the floating diffusion FD. As a result, the floating diffusion FD holds a charge (PD34+RES (it should be noted that PD34=PD3+PD4)).

At time t9, if the select signal SEL is turned on, voltage of the charge (PD34+RES) that has accumulated in the floating diffusion FD is read out from the output terminal OUT.

In this way, in the first readout, at time t4 an added value PD12, of signal charge output PD1 for the upper left photodiode and signal charge output PD2 for the lower left photodiode, is read out. Also, at time t9 an added value PD34, of signal charge output PD3 for the upper right photodiode and signal charge output PD4 for the lower right photodiode, is read out. Specifically, in the first readout, a pair of focus detection pixel signals A and B of the image sensor 208 are respectively read out in readout 1.

Next, operation for second readout (image pixels priority mode) will be described using the timing charts shown in FIG. 7 to FIG. 9.

FIG. 7 is a timing chart showing a first example of operation of an image sensor 208 when performing an electronic shutter operation at the time of image pixels priority mode. It should be noted that in FIG. 7 to FIG. 11 points that are the same as in FIG. 5 and FIG. 6 will be omitted where appropriate, to simplify the following description.

At time t7, the reset signal RES is turned on, and the reset signal RES that was turned on is turned off at the time t9.

Then, at time t8 where the reset signal RES is on, the control signals TX1 to TX4 are turned on, and signal charges for photodiodes PD1-PD4 are reset.

FIG. 8 is a timing chart showing a second example of operation of an image sensor 208 when performing an electronic shutter operation at the time of image pixels priority mode. As will be described later with reference to FIG. 9, in pixel signal readout for image pixels priority mode, signal charges for photodiodes PD1 and PD2 are read out at time t3, and signal charges for photodiodes PD1-PD4 are readout at time t8. Therefore, with the second example shown in FIG. 8, by performing reset of the photodiodes PD1-Pd4 for the electronic shutter operation two times, namely at time t3 and at time t8, variation in power supply voltage VDD becomes constant (steady).

Specifically, at time t2, the reset signal RES is turned on, and the reset signal RES that was turned on is turned off at time t4. Then, at time t3 where the reset signal RES is on, the control signals TX1 to TX4 are turned on, and signal charges for photodiodes PD1-PD4 are reset.

Further, at time t7, the reset signal RES is turned on, and the reset signal RES that was turned on is turned off at time t9. Then, at time t8 where the reset signal RES is on, the control signals TX1 to TX4 are turned on, and signal charges for photodiodes PD1-PD4 are reset.

FIG. 9 is a timing chart showing an operational example of the image sensor 208 when performing pixel signal readout at the time of image pixels priority mode.

At time t1 the reset signal RES is turned on to reset the floating diffusion FD, and at time t2 a voltage of the reset charge (RES) is read out. Next, at time t3, signal charges for photodiodes PD1 and PD2 are transferred to the floating diffusion FD. A voltage of the charge (PD12+RES) is then read outside time t4.

Next, at time t8, signal charges for photodiodes PD1 to PD4 are transferred to the floating diffusion FD. At time t9 voltage of the charge (PD1234+RES (it should be noted that PD1234=PD1+PD2+PD3+PD4)) is read out.

It should be noted that in the case of performing the operations shown in FIG. 9, exposure times are different for the charge read out at time t4 and the charge read out at time t9. However, since this difference in exposure time is small compared to actual exposure time (for example, 1/30th of a second to 1/1000th of a second), it is considered that there is almost no actual effect.

In this way, in the second readout, at time t4 an added value PD12, of signal charge output PD1 for the upper left photodiode and signal charge output PD2 for the lower left photodiode, is read out. Also, at time t9 an added value PD1234, of signal charge output PD1 for the upper left photodiode, signal charge output PD2 for the lower left photodiode, signal charge output PD3 for the upper right photodiode, and signal charge output PD4 for the lower right photodiode, is read out. Specifically, with second readout, one of either of the pair of focus detection pixel signals A and B (here, for example, it is made the focus detection pixel signal A) of the image sensor 208, and an image pixel signal (A+B) resulting from addition of the pair of focus detection pixel signals A and B, are output.

Next, operation for third readout (image only mode) will be described using the timing charts shown in FIG. 10 and FIG. 11.

Figure 10:
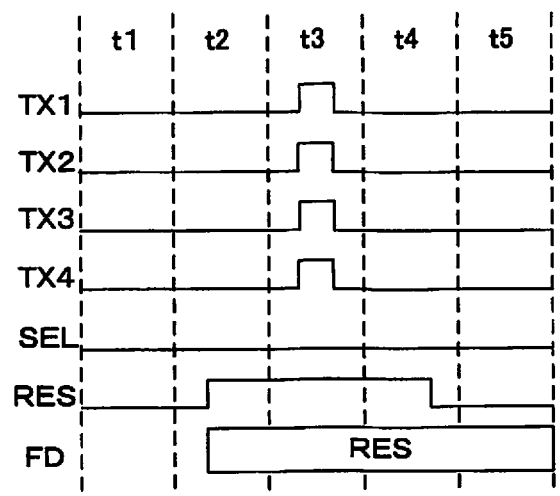
FIG. 10 is a timing chart showing an operational example of an image sensor when performing an electronic shutter operation at the time of image only mode, in the imaging device of one embodiment of the present invention.

FIG. 10 is a timing chart showing an operational example of the image sensor 208 when performing an electronic shutter operation at the time of image only mode. At time t2, the reset signal RES is turned on, and the reset signal RES that was turned off is turned off at time t4. Then, at time t3 where the reset signal RES is on, the control signals TX1 to TX4 are turned on, and signal charges for photodiodes PD1-PD4 are reset.

Figure 11:
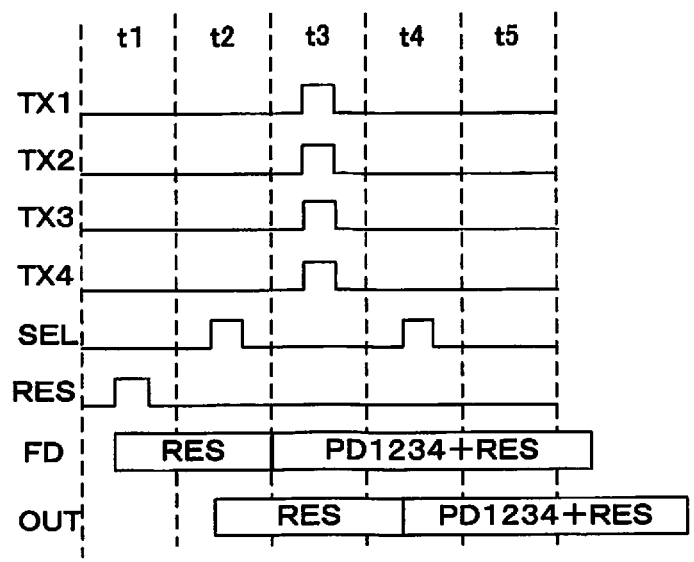
FIG. 11 is a timing chart showing an operational example of an image sensor when performing pixel signal readout at the time of image only mode, in the imaging device of one embodiment of the present invention.

FIG. 11 is a timing chart showing an operational example of the image sensor 208 when performing pixel signal readout at the time of image only mode. At time t1, the reset signal RES is turned on to reset the floating diffusion FD. A voltage of the reset charge (RES) is then read out at time t2. At time t3, signal charges for photodiodes PD1 to PD4 are transferred to the floating diffusion FD. A voltage of the charge (PD1234+RES) is read out at time t4. It is possible to detect a signal voltage corresponding to charge (PD1234) by subtracting a voltage of the reset charge (RES) from a voltage of the charge (PD1234+RES) using the CDS circuit of the analog processing section 23.

With image only mode (third readout) performing the electronic shutter operation as was shown in FIG. 10 and performing the pixel signal read out that was shown in FIG. 11, it is possible to acquire an image pixel signal. However, it is not possible to acquire a focus detection pixel signal. However, since readout is completed in one go, it is convenient at the time of display or storage of an image without performing focus detection.

Next, operation of a modified example of first readout (focus detection pixels priority mode) will be described using the timing charts shown in FIG. 19 and FIG. 20. The modified example of first readout is an operation to read out only one focus detection pixel signal from the pair of focus detection pixel signals.

Figure 19:
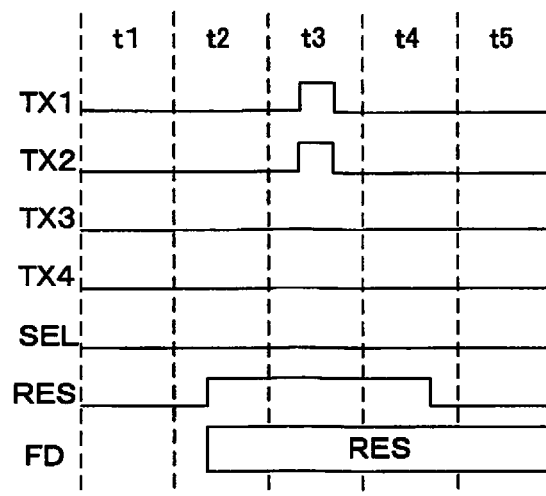
FIG. 19 is a timing chart showing an operational example of an image sensor when performing an electronic shutter operation, with a modified example of focus detection pixels priority mode, in the imaging device of one embodiment of the present invention.

FIG. 19 is a timing chart showing an operational example of an image sensor 208 when performing an electronic shutter operation at the time of focus detection pixels priority mode. FIG. 19 is the same as the portions for t1 to t5 in FIG. 5. At time t2, if the reset signal RES is turned on then the floating diffusion FD is reset. This reset signal RES remains on until the reset SIGNAL RES is turned off at time t4. At time t3, if control signals TX1 and TX2 are turned on then since at this point in time the reset signal RES is on, signal charge of the photodiodes PD1 and PD2 is reset.

Figure 20:
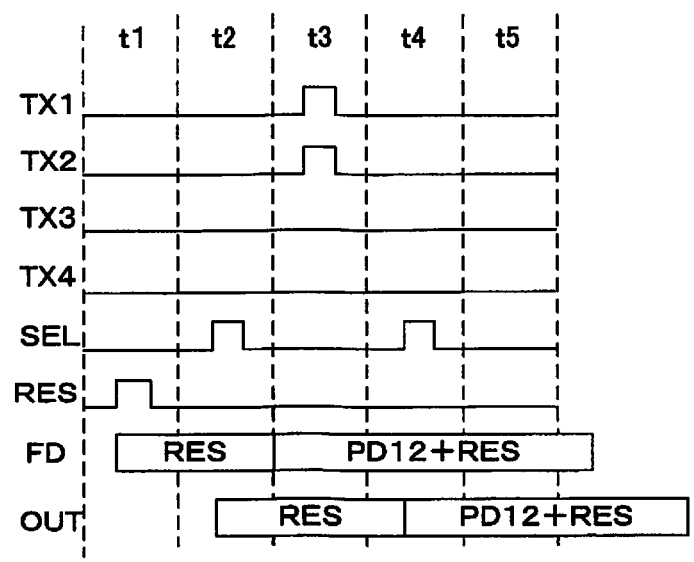
FIG. 20 is a timing chart showing an operational example of an image sensor when performing pixel read out of one among a pair of focus detection pixels signals, with a modified example of focus detection pixels priority mode, in the imaging device of one embodiment of the present invention.

FIG. 20 is a timing chart showing an operational example of an image sensor 208 when performing one pixel signal readout of a pair of focus detection pixel signals, in focus detection pixels priority mode. FIG. 20 shows a readout operation of a pixel signal performed after the exposure time (corresponding to so-called shutter speed) has elapsed from the electronic shutter operation that was shown in FIG. 19. It should be noted that FIG. 20 shows the same operations as in t1 to t5 in FIG. 6.

At time t1 in FIG. 20, if the reset signal RES is turned on then the floating diffusion FD is reset. As a result of this reset, the floating diffusion FD holds a reset charge (RES). At time t2, if the select signal SEL is turned on, a voltage of the reset charge (RES) that has accumulated in the floating diffusion FD is amplified by the transistor Tr7 and read out from the output terminal OUT.

At time t3, if the control signals TX1 and TX2 are turned on then signal charge of photodiode PD1 (this signal charge is made PD1) and the signal charge of photodiode PD2 (this signal charge is made PD2) are transferred to the floating diffusion FD. As a result, the floating diffusion FD holds a charge (PD12+RES (it should be noted that PD12=PD1+PD2)).

At time t4, if the select signal SEL is turned on, voltage of the charge (PD12+RES) that has accumulated in the floating diffusion FD is read out from the output terminal OUT, as described above. A reset voltage (reset noise) that is included in this voltage that has been read out at time t4 is removed, by a CDS circuit of the analog processing section 23, using a reset voltage that was read out at time t2. After that, although description is omitted, reset noise is similarly removed.

In this way, in the modified example of first readout, at time t4 an added value PD12, of signal charge output PD1 for the upper left photodiode and signal charge output PD2 for the lower left photodiode, is read out. Specifically, with the modified example of first readout, of the pair of focus detection pixel signals A and B of the image sensor 208, only focus detection pixel signal A is output. It should be noted that instead of the added value PD12, added value PD34, for the signal charge output PD3 of the upper right photodiode and signal charge output PD4 of the lower right photodiode, may be read out.

Also, instead of the added value PD12, added value PD13, for the signal charge output PD1 of the upper left photodiode and signal charge output PD3 of the upper right photodiode, may be read out. In this case, added value PD24 is calculated by subtracting added value PD13 from added value PD1234 resulting from third readout of a still picture frame, and it becomes possible to perform correlation calculation for different pupil-division directions based on the added values PD13 and PD24.

By using the modified example of focus detection pixel priority mode (first readout) where an electronic shutter operation such as was shown in FIG. 19 is performed and pixel signal read out such as was shown in FIG. 20 is performed, and image pixel priority mode (second readout) where an electronic shutter operation such as was shown in FIG. 7 or FIG. 8 is performed and image signal readout such as was shown in FIG. 9 is performed, then as will be described later, by subtracting one side opening pixel data (for example PD12) that has been read out, from an added value for left and right opening pixels (PD1234), other side opening pixel data (PD34) is obtained, and it is possible to acquire both an image pixel signal and a focus detection pixel signal. In this case, however, readout is performed twice.

Next, operation of the imaging device 1 of this embodiment will be described using the flowcharts shown in FIG. 12A and FIG. 12B. Here, FIG. 12A and FIG. 12B show operation at the time an AF mode of the imaging device 1 is continuous AF mode. Continuous AF mode is an AF mode that is suitable for a moving subject, and is an AF mode where focusing is performed continuously so as to track a subject.

If an on operation of the power supply of the imaging device 1 by the user is detected, the flow for camera power supply on shown in FIG. 12A is commenced. If the power supply on operation is detected, it is first determined whether or not a 1st release is on (S1). Here, the CPU 212 determines whether or not a 1st release switch of a release button within the operation section 206 is in an on state. The 1st release switch is a switch that is put in an on state in response to a half press operation of a release button by the user, for example. If the user focuses on a subject and decides on exposure, the release button is pressed down halfway.

If the result of determination in step S1 is that the 1st release switch is not on, acquisition of live view (LV) is performed (S3). Here, the CPU 212 outputs a control signal to the drive section 204 so as to put the mechanical shutter 202 in a fully-open state, as well as outputting a control signal to the lens CPU 106 so as to move the aperture 102*b* by a given amount (for example, open aperture wider). After that, the CPU 212 outputs a control signal to the image sensor 208 and imaging for LV display is commenced by the image sensor 208 Every time imaging for LV display is completed, the element control section 29 commences readout of pixel signals from the pixel section 22. It should be noted that at the time of pixel signal readout, readout is performed using third readout described above, and the element control section 29 adds pixel signals of the same opening (color) output from the pixel section 22. Pixel data for display that has been output from the image sensor 208 is stored in the DRAM 226.

Also, the CPU 212 performs live view (LV) display in step S3. At this time, the CPU 212 causes generation of display image data in the image processing circuit 214. In response to this, the image processing circuit 214 performs necessary processing on the pixel data for display to generate display image data for display. The CPU 212 displays an LV image on the display section 222 based on display image data that has been generated by the image processing circuit 214. Once the LV display has been performed, processing returns to step S1.

If the result of determination in step S1 is that the 1st release switch is on, exposure and readout for AF and LV are performed (S5). Here, the CPU 212 performs imaging and readout for autofocus (AF) and live view (LV) display. Imaging and readout for AF are performed using the above described second readout. With second readout, one of either of the pair of focus detection pixel signals A and B (here, for example, it is made the focus detection pixel signal A) from the image sensor 208, and an image pixel signal (A+B) resulting from addition of the pair of focus detection pixel signals A and B, are output. By subtracting the focus detection pixel signal A from the added image pixel signal (A+B) it is possible to obtain the focus detection pixel signal B. The added image pixel signal (A+B) is then used for LV display. Alternatively, imaging and readout for AF may be performed using the above described first readout, and imaging and readout for LV display may be performed using the above described third readout, and the first readout and the third readout may be alternately and repeatedly executed.

Focus detection using a phase difference method Is performed using the focus detection pixel signals A and B that were calculated in step S5. In this step, data of the focus detection pixel signals A and B for AF is stored in the DRAM 226. It should be noted that in a case where the 4PD pixel structure is adopted, it is possible to calculate a pair of focus detection pixel signals respectively for the horizontal direction (left and right direction) and the vertical direction (up and down direction), and it is possible to calculate the phase difference for the respective directions. Also, the image pixel signal (A+B) is stored in the DRAM 226 as display pixel data for LV. Here, live view display is based on the pixel data for display that has been stored in the DRAM 226.

Next, correlation calculation and reliability determination are performed (S7). Here, the CPU 212 executes focus detection calculation using the focus detection circuit 218. The focus detection circuit 218 performs correlation calculation using focus detection pixel data (focus detection pixel signals A and B) that constitute a pair, among focus detection pixel data that is stored in the DRAM 226. Focus detection pixel data that constitutes a pair in the case of phase difference detection in the horizontal direction is the left opening pixel data 1 and the right opening pixel data r, while the focus detection pixel data that constitutes a pair in the case of phase difference detection in the vertical direction is the top opening pixel data t and the bottom opening pixel data b. After correlation calculation, the focus detection circuit 218 performs reliability detection for focus detection.

Reliability determination is determination based on contrast obtained from pixel data, for example, and/or correlation values etc. calculated as results of correlation calculation.

Once correlation calculation and reliability determination have been performed, next focus deviation amount is detected (S9). Here, the focus detection circuit 218 performs focus deviation amount calculation. Specifically, the focus detection circuit 218 calculates focus deviation amount for an in-focus position of the focus lens 102a from a two-image interval value for focus detection regions in which it has been determined that the result of reliability determination in step S7 is high reliability (image shift amount corresponding to extreme value of correlation value).

If a focus deviation amount has been detected, next an area is selected (S11). Here, the focus detection circuit 218 performs area selection processing in order to select a focus detection region in which to calculate target focus lens position used in drive of the focus lens 102a. Area selection processing selects a focus detection region exhibiting a focus deviation amount for which a target focus lens position has been calculated in accordance with the closest subject distance (that is, at the closest range). Also, the area selection processing is not limited to the closest range, and it is also possible to select an area in which a person's face exists, and it is also possible have an area that has been selected manually by the user. It should be noted that area selection may also be performed by the CPU 212.

If area selection has been performed, it is next determined whether or not there is a focused state (S13). Here, the CPU 212 determines whether or not the focus lens 102a is in a focused state. This determination is determination as to whether or not a focus deviation amount for the focus detection region that was selected in the area selection processing, for example, is within a previously determined permissible range. When the focus deviation amount is within a permissible range a focused state is determined.

If the result of determination in step S13 is not a focused state, the focus lens is driven (S15). Here, the CPU 212 outputs a control signal to the lens CPU 106 so as to drive the focus lens 102a to a target focus lens position that was calculated for the focus detection region that was selected in step S11. The lens CPU 106 receives this control signal and drives the focus lens 102a by means of the drive section 104. Once the focus lens 102a has been driven processing returns to step S1.

If the result of determination in step S13 is a focused state, exposure and readout for AF and LV are performed (S17). Here, the CPU 212 performs the same imaging and readout for autofocus (AF) and live view (LV) display as was performed in step S5. As was described previously, a pixel signal is read out from the image sensor 208 using second readout, focus detection pixel data for AF is stored in the DRAM 226, and display pixel data for LV is stored in the DRAM 226. Also, live view (LV) display is performed on the display section 222 using the display pixel data for LV.

Next, correlation calculation and reliability determination are performed (S19). Here, similarly to step S7, the CPU 212 causes execution of focus detection calculation by the focus detection circuit 218, using a pixel signal that was read out in step S17. The focus detection circuit 218 performs correlation calculation using focus detection pixel data that constitute a pair, among focus detection pixel data that is stored in the DRAM 226. After correlation calculation, the focus detection circuit 218 performs reliability detection for focus detection. If correlation calculation and reliability determination have been performed, next, similarly to step S9, focus deviation amount is detected (S21), and, similarly to step S11, area selection is performed (S23).

Once area selection has been performed, next history information is saved (S25). Here, the focus detection circuit 218 saves information relating to focus detection as history information in the DRAM 226, for example. Information relating to focus detection includes, for example, information on the focus deviation amount that was calculated in step S21, and information on the focus detection region that was selected instead S23. It should be noted that saving of history information may also be the CPU 212 saving information relating to focus detection in the DRAM 226.

Once history information has been saved, it is next determined whether or not the 2nd release switch is on (S31). Here, the CPU 212 determines whether or not the 2nd release switch within the operation section 206 has been turned on. The 2nd release switch is a switch that is put in an on state in response to a full press operation of a release button by the user, for example. The user presses the release button down fully in the case of shooting a still image.

If the result of determination in step S31 is that the 2nd release switch is not on, it is next determined whether or not there is a focused state (S33). Here, the CPU 212 determines whether or not the focus lens 102a is in a focused state, Similarly to step S13. If the result of this determination is a focused state, processing returns to step S17.

If the result of determination in step S33 is not a focused state, the focus lens is driven (S35). Here, similarly to step S15, the CPU 212 moves the focus lens 102a to an appropriate focus lens position based on the focus deviation amount. If focus lens drive has been performed, processing returns to step S17.

If the result of determination in step S31 is that the 2nd release switch is on, next moving body estimation computation is performed (S37). Here, the CPU 212 causes execution of moving body estimation computation by the focus detection circuit 218. As was described previously the flow shown in FIG. 12A and FIG. 12B is a case where continuous shooting mode has been set, and in a case where a subject is moving also, focus control is performed to estimate subject movement so as to achieve focus for each frame that is continuously shot. Moving body estimation computation is estimating a position the focus lens 102a should be driven to for focusing on a subject for the current still picture exposure time, based on history of results of previous focus deviation amount calculation (focus lens position) that were stored in step S25.

If moving body estimation computation has been performed, next a shutter operation is commenced (S39). Here, the CPU 212 causes commencement of operation of the mechanical shutter 202 in order to perform imaging (actual exposure) for still picture acquisition. This operation of the mechanical shutter 202 includes opening and closing operations of the mechanical shutter 202 before and after actual exposure, and a fully open operation of the mechanical shutter 202 after actual exposure, in order to commence imaging for live view and AF. The CPU 212 first switches control signals of the drive section 204 so as to put the mechanical shutter 202 in a fully closed state. Then, after actual exposure has been performed in step S43, the CPU 212 controls the drive section 204 soul is to put the mechanical shutter 202 in a fully open state.

If the shutter operation has been commenced, the aperture and lens drive are simultaneously commenced (S41). Here, the CPU 212 instructs the lens CPU 106 so as to drive the focus lens 102a and the aperture 102b at the same time, and operations for both components are commenced. Here, drive position for the focus lens 102a is a position that was estimated in the moving body estimation computation of step S37. Also, opening amount of the aperture 102b is an opening amount corresponding to the aperture value that has been calculated based on subject brightness that was estimated as a result of previous photometry computation.

Next, actual exposure, and AF exposure and readout, are performed (S43). Here, the CPU 212 causes actual exposure to start, and after actual exposure has been completed reads out pixel signals from the image sensor 208 using the previously described third readout. Actual exposure is imaging in order to acquire image data for storage. With actual exposure, the CPU 212 causes commencement of imaging of the image sensor 208. After an exposure period is complete, the CPU 212 reads out pixel signals from each light receiving section of the image sensor 208 as still picture pixel signals. After readout of the still picture pixel signals, the CPU 212 causes processing for generating an image pixel signal for storage to be performed in the image processing circuit 214. In response to this the image processing circuit 214 generates still picture data for storage by performing necessary processing to generate image data full storage. After completion of image processing, the CPU 212 compresses the still picture data storage using the image compression and expansion section 216. After completion of compression, the CPU 212 stores the still picture data for storage that has been compressed in the storage medium 230 as an image file.

Figure 13:
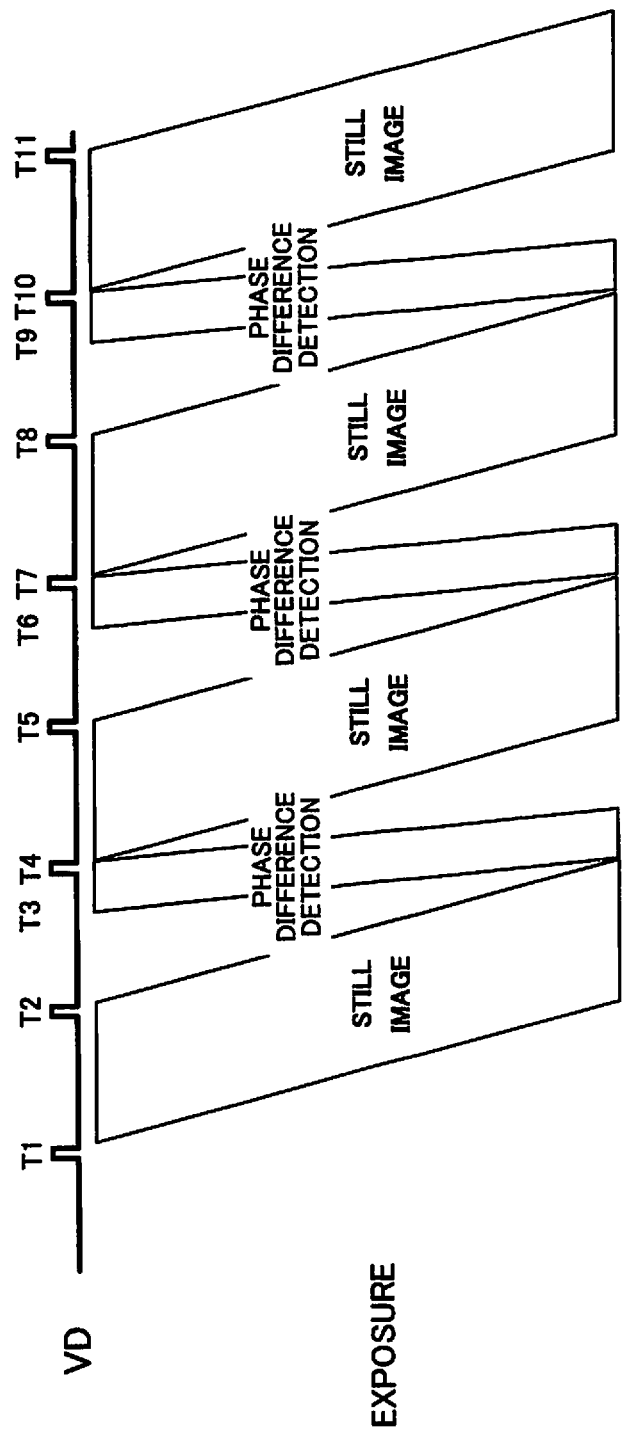
FIG. 13 is a timing chart showing operation at the time of still picture continuous shooting, in the imaging device of one embodiment of the present invention.

Also, in step S43, while the 2nd release switch is on, the CPU 212 continues to alternate between actual exposure and readout (still picture), and AF exposure and readout (phase difference detection) as in FIG. 13, which will be described later (in the case of Yes in step S57, which will be described later, processing returns to step S43). AF exposure is performing exposure with exposure control values (for example, electronic shutter speed and ISO sensitivity) at which focus detection pixels will achieve appropriate exposure. Also, AF exposure is performed between one actual exposure and another actual exposure. This pixel signal readout for AF exposure is performed with first readout to read out a signal from the focus detection pixels. Timing for actual exposure and AF exposure will be described later using FIG. 13.

Once the AF exposure and readout of step S43 have been performed, next correlation calculation and reliability determination are performed (S45). After actual exposure and readout have been performed in step S43, AF exposure and readout are performed, and processing from steps S45 to S53 is performed. The correlation calculation and reliability determination of step S45 is performed similarly to steps S7 and S19, using a signal from focus detection pixels that was acquired in step S43.

Once correlation calculation and reliability determination have been performed, next focus deviation amount is detected (S47). Here, focus deviation amount is detected similarly to steps S9 and S21, based on the correlation calculation that was calculated in step S45. Next, area selection is performed (S49). Here, the focus detection circuit 218 performs area selection, similarly to steps S11 and S23, based on a focus deviation amount that was detected in step S47.

Once area selection has been performed, next history information is saved (S51). Before continuous shooting of still pictures and during continuous shooting of still pictures, AF exposure is performed continuously (refer to S17 and S43), and focus deviation amount is detected. The focus detection circuit 218 saves information relating to focus detection as history information in the DRAM 226, for example.

Once history information has been saved, moving body estimation computation is performed (S53). Here, similarly to step S37, moving body estimation computation is performed based on history information that was saved in step S53. If moving body estimation computation has been performed, next, focus lens drive is performed (S55). Here, similarly to step S37, position of the focus lens 102a at the time of actual exposure is estimated, and the focus lens 102a is moved to this position.

It is next determined whether or not the 2nd release switch is on (S57). If the user is continuing rapid shooting, the release button will still be pressed down fully. In this step, the CPU 212 determines whether or not the 2nd release switch within the operation section 206 has been turned on. If the result of this determination is that the 2nd release switch is off, step S43 is returned to.

On the other hand if the result of determination in step S57 is that the 2nd release switch is not on, it is next determined whether or not the 1st release switch is on (S59). Here, similarly to step S1, the CPU 212 determines whether or not a 1st release switch of a release button within the operation section 206 is in an on state. If the result of this determination is that the 1st release switch is on, processing returns to step S17.

On the other hand, if the result of determination in step S59 is that the 1st release switch is not on, it is determined whether or not the camera power supply is off (S61). Here, the CPU 212 determines whether or not to turn the power supply of the camera body 200 off. For example, if the user operates the operation section 206 and instructs power supply off, or if the user has not operated the operation section 206 for a specified time, it is determined to turn the power supply off. If the result of this determination is not to turn the power supply of the camera body 200 off, processing returns to step S1. On the other hand if it has been determined in step S61 to turn the power supply of the camera body 200 off, the processing shown in FIG. 12A and FIG. 12B is terminated.

Figure 12B:
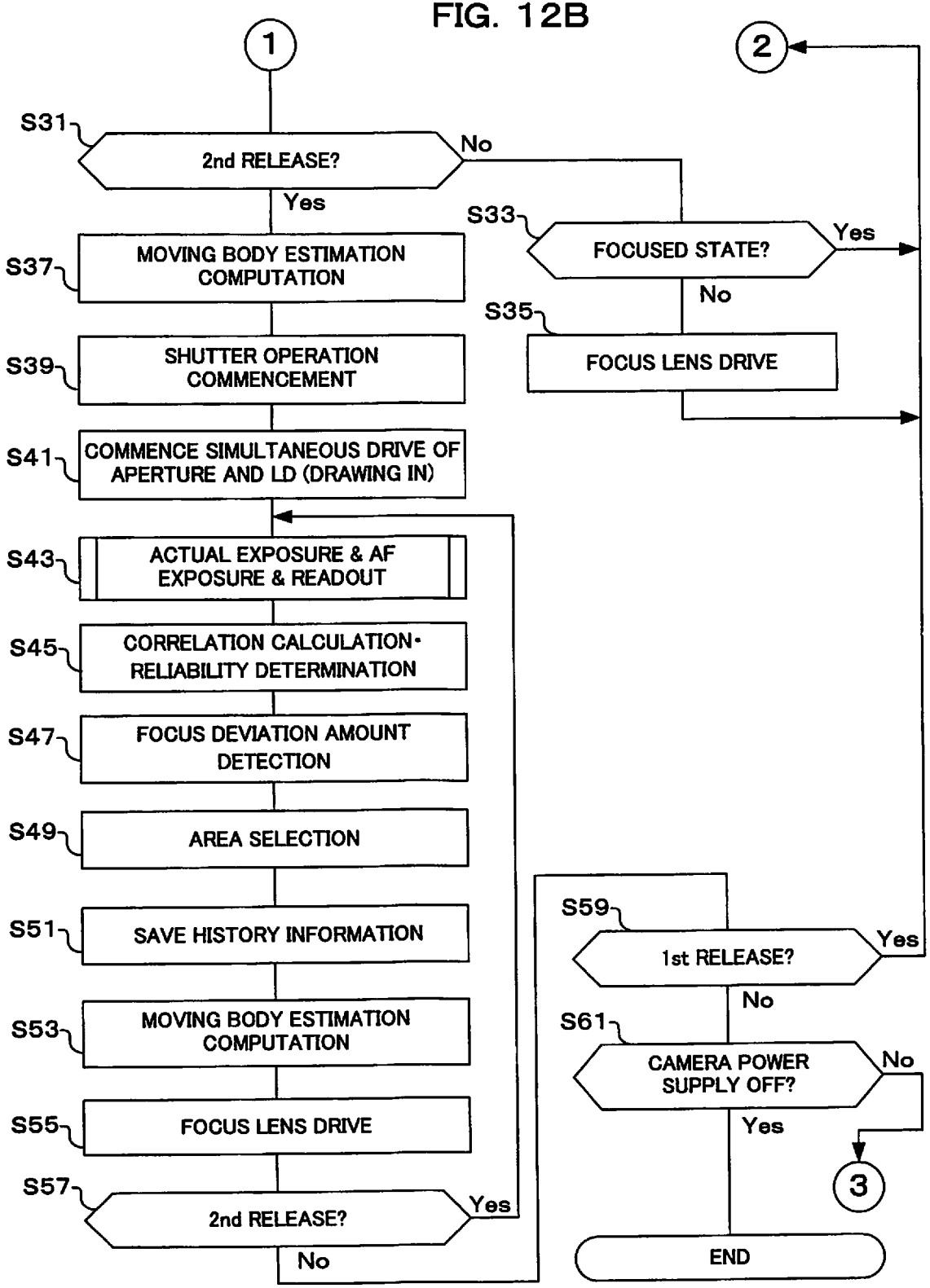

In this way, in the flow of FIG. 12A and FIG. 12B, in a case where the release button has been pressed down fully actual exposure (still picture frame) and AF exposure (phase difference frame) are alternately and repeatedly executed (refer to S43). In a case where AF exposure has been performed, correlation calculation and detection of focus deviation amount are performed based on a pixel signal of focus detection pixels that has been acquired as a result of this AF exposure, and moving body estimation and focus lens drive are performed based on this detection result.

Next, the actual exposure (still picture frame) and AF exposure (base difference frame) in step S43 will be described using FIG. 13. In FIG. 13, VD represents timing of a vertical synchronization signal, and T1 to T11 in the horizontal axis direction represent times. Also, the vertical axis direction represents exposure timing for each line of the pixel section 22 of the image sensor. Left and right edges of parallelograms representing each frame represent exposure commencement time and exposure completion time for each respective line. At time T1 initial (first frame) actual exposure is commenced, and exposure is commenced sequentially from the first line of the pixel section 22 of the image sensor 208, at time T2 exposure for the first line is completed, and after that actual exposure for the second frame commences at time T4, actual exposure for the third frame commences at time T7, and actual exposure for the fourth frame commences at time T10. For respective actual exposures, as image data for a still picture, image data for an image only is acquired using the previously described third readout.

Also, between one actual exposure and another actual exposure, pixel data of focus detection pixels for phase difference detection are read out. B Specifically, at time T3 exposure for initial (first frame) phase difference detection is commenced, exposure for the first line is completed at time T4, and after that exposure for phase difference detection of the second frame commences at time T6, and exposure for phase difference detection of the third frame commences at time T9. In the respective exposure for phase difference detection, as image data for phase difference detection, image data for phase difference detection is acquired using the previously described first readout. It should be noted that at the time of phase difference detection, image data for phase difference detection corresponding to openings of one side is acquired by the previously described second readout, and phase difference detection image data corresponding to openings of the other side may be obtained by subtracting image data for phase difference detection from image data that has been acquired for a still picture. It should be noted that in FIG. 13, the reason that change in times for commencement and completions of exposure for each line for phase difference detection is different to that for a still picture is that while all image pixels are read out for a still picture, for phase difference detection pixels addition and thinning are performed, as will be described later.

In this way, with this embodiment, at the time of acquiring image data of a still picture with rapid shooting, exposure for phase difference detection (phase difference frame) is performed between one actual exposure for still picture shooting (still picture frame) and another actual exposure. Specifically, imaging operations to generate pixel signals for storage, and imaging operations to generate phase difference detection pixel signals, are performed alternately. This means that it is possible to read out a pixel signal for storage, and to read out a phase difference detection pixel signal, at high speed without the occurrence of invalid frames. Accordingly, since an image for storage is not degraded, and it is possible to perform focus detection of the subject, it is possible to acquire a focused image even with a moving subject when high-speed rapid shooting is in progress. Also, the imaging drive mode for alternately and repeatedly executing a shooting frame (third readout) and a phase difference frame (first readout) may be set in advance within the image sensor 208. As a result, it is possible to reduce the amount of communication from the CPU 212 to the image sensor 208 at the time of rapid shooting of still pictures, such as commands for switching imaging drive mode. It is also possible to avoid the occurrence of invalid frames accompanying switching of imaging drive mode within the image sensor 208 at the time of continuous shooting, and to avoid time lag caused by such invalid frames.

Next, an example of pixel addition at the time of first readout will be described using FIG. 14. With the example shown in FIG. 14, setting is performed so as to perform only addition in the vertical direction, which is the second pupil division direction, without performing addition for the horizontal direction, which is the first pupil division direction. Specifically, in the horizontal direction pixel signal setting is performed so that for the same openings (associated left openings or associated right openings) are subjected to 1/1 pixel addition (that is, no addition), and in the vertical direction pixel setting is performed so that signals for the same openings (associated left openings or associated right openings) are subjected to 5/9 pixel addition. Here, 5/9 pixel addition means adding of 5 pixels R1 corresponding to m1 to n9, or the addition of 5 pixels Gbl corresponding to n2 to n10, among 9 pixels in the vertical direction (with the example of m1 in FIG. 14, 9 respective pixels for R1 corresponding to n1 to n17, or 9 respective pixels Gbl corresponding to n2 to n18). A number of additions of pixel signals may be set appropriately in accordance with frame rate, for example.

FIG. 15 shows added pixels for phase difference pixels (focus detection pixels) of a phase difference frame, for every column. The example here shows a case where only G pixels are extracted, in order to increase speed. For example, with column m1 an added value Gr_L for a line of left opening Grl pixels n1, n3, n5, n7 and n9 of column m3 in FIG. 14 is calculated, and with column m2 an added value Gr_R for a line of right opening Grr pixels n1, n3, n5, n7 and n9 of column m4 in FIG. 14 is calculated. Also, similarly, with column m1 an added value Gb_L for a line of left opening Gbl pixels n2, n4, n6, n8 and n10 of column m1 in FIG. 14 is calculated, and with column m2 an added value Gb_R for a line of right opening Gbr pixels n2, n4, n6, n8 and n10 of column m2 in FIG. 14 is calculated. Other addition pixel values in FIG. 15 are also calculated by means of the calculation processing with the same procedure.

In this way, for each line, addition values Gr_L, Gr_R, Gb_L and Gb_R for 5 pixels of Grl and Grr pixels, or Gbl and Gbr pixels, are calculated, and stored in memory in the format shown in FIG. 15. The correlation calculation of step S45 etc. is implemented using these addition values Gr_L and Gr_R, and Gb_L and Gb_R. It should be noted that the description in FIG. 15 can be applied to up to column m40 that is not shown in FIG. 14, which is only showing up to column m20. For example, R pixels Gr of lines n1 to n9 in column 20 of FIG. 15 are added values Gr_R for right opening Grr pixels of lines n1, n3, n5, n7 and n9 of column m40 that is not shown in FIG. 14.

By performing 5/9 pixel addition such as shown in FIG. 14 and FIG. 15, the number of lines of pixel signals is compressed. By reducing the number of lines of pixel signals, readout time for the pixel signals is shortened. On the other hand, number of columns of pixel signals does not change, which means that it is possible to ensure detection precision for phase difference in the horizontal direction. A focus detection pixel signal generated based on a pixel signal has information on phase difference in a substantially diagonal direction. It should be noted that with the example of FIG. 14, although setting has been performed so as to add five pixel signals for the vertical direction, the number of additions in the vertical direction may be five pixels or less.

After the setting of pixel readout, such as shown in FIG. 14 and FIG. 15, the CPU 212 outputs control signals to the image sensor 208 so as to perform imaging at an exposure time necessary to generate a focus detection pixel signal. This exposure time is set based on subject brightness etc. Also, receiving input of control signals from the CPU 212, the element control section 29 commences imaging for each line of the pixel section 22. The element control section 29 then controls a vertical scanning circuit 304 to sequentially output pixel signals from lines of the pixel section 22 for which imaging has been completed.

Next, another example of readout of phase difference pixels in a case where still picture frames and phase difference frames are alternately and repeatedly executed will be described using FIG. 16 and FIG. 17. This example corresponds to the previously described modified example of first readout. With this example, pixel data of either one of left opening pixels or right opening pixels is read out, as shown in the modified example of first readout in FIG. 19 and FIG. 20. Then, by subtracting pixel data for one side opening that has been read out (for example, PD12) from an added value (PD1234) for left and right opening pixels being acquired in response to a still picture frame, the other side opening pixel data (PD34) is obtained. Specifically, in step S43 of FIG. 12B, the CPU 212 obtains a right opening pixels value lm_difr (PD34) by subtracting a left opening pixels value lm_difl (PD12) from an all pixels value lm_ful (PD1234) for R pixels, GR pixels, Gb pixels and B pixels, shown in FIG. 16. As a result, it is possible to calculate left opening pixel values (PD12) and right opening pixel values (PD34) among the focus detection pixels, and it is possible to perform correlation calculation in step S45 using this focus detection pixel value that has been calculated.

FIG. 17 shows added pixels for phase difference pixels (focus detection pixels) of a phase difference frame, for every column. It should be noted that in FIG. 17 also, addition processing for phase difference pixels (focus detection pixels) of a phase difference frame for every column is performed in the same way as shown in FIG. 15.

When reading out the phase difference frame shown in FIG. 16, only pixel values (PD12) of left opening pixels are read out. This means that for m1, m3, m5, m9, m11, m15, m17 and m19, which are left opening pixel columns, a value for which addition processing has been performed is read out, while addition processing is not performed for pixel values such as m2, m4, m6 and m8, which are right opening pixel columns, and there is no readout. With the column m1 in FIG. 17, Grl pixel values for lines n1, n3, n5, n7 and n9 of column m3 in FIG. 14 are added and made an added value Gr_L, while Gbl pixel values for lines n2, n4, n6, n8 and n10 of column m1 in FIG. 14 are added and made an added value Gb_L, and these values are stored in memory. For other lines also, addition is performed using the same procedure and added values are stored in memory.

Compared to the case of first readout that was described using FIG. 14 and FIG. 15, with the modified example of first readout, since it is only necessary to read out one side opening pixel column, it is possible to make the system high speed. However, for other side opening pixel columns pixel values are obtained by computational processing by the CPU 212 from pixel values that have been acquired at different exposure timings, which means that detection precision is slightly lowered. This means that when focus detection precision is required to be high, for example, in a case of extremely high precision and at the time of wide-open aperture etc., the modified example of first readout should be adopted. In the case of super high speed still picture rapid shooting, if a time difference between a still picture frame and a phase difference frame is extremely small, this modified example should be used.

Next, an initial valid frame, at the time of switching to imaging drive mode, when actual exposure and pressing down of the 1st release have been performed, will be described using FIG. 18A and FIG. 18B. It should be noted that in FIG. 18A and FIG. 18B, the horizontal axis represents time.

FIG. 18A is a drawing showing switching of an imaging drive mode, specifically from a state where live view display is being performed before actual exposure, to actual exposure. In a state where live view display is being performed (T21) without the user operating the release button, if time T21a is reached the user presses the release button down fully and the 2nd release switch is turned on. The CPU 212 detects the 2nd release switch being turned on.

At time T22, the image sensor 208 performs readout of pixel values for live view display. Readout of pixel values is also being performed at time T23, but in response to the 2nd release switch being on the CPU 212 issues an imaging drive mode switching command to the image sensor 208 at this time. Specifically, the CPU 212 issues a command to the image sensor 208 to switch from pixel signal for live view display generating mode to an imaging drive mode in which pixel signal generation for a still picture frame and pixel signal generation for phase difference detection are alternately executed. The element control section 29 of the image sensor 208 receives this switching command via the input section 28. Then, the element control section 29 controls each block within the image sensor 208 to switch from pixel signal for live view display generating mode to an imaging drive mode in which pixel signal generation for a still picture frame and pixel signal generation for phase difference detection are alternately executed. At that time, in the imaging drive mode in which pixel signal generation for a still picture frame and pixel signal generation for phase difference detection are alternately executed, the CPU 212 issues a command to the image sensor 208 so as to execute an initial pixel signal for still picture frame generation.

At time T23 in FIG. 18A, there is a switch from pixel value for live view display readout to pixel value for still picture frame readout. As a result of this, pixel values at time T23 are treated as pixel values of an invalid frame. Then, readout is alternately performed for pixel values of a still picture frame at time T24, and pixel values for a phase difference frame time T25. After that also, while the 2nd release is on, pixel values for still picture frames and pixel values for phase difference frames are alternately output from the image sensor 208, and are respectively read out and processed by the image processing circuit 214 and the focus detection circuit 218.

In this way, it is ensured that a still picture frame is handled as an initial valid frame after the 2nd release has been pressed down. As a result, since the initial valid frame constitutes a still picture exposure, it is possible to make shutter release time lag as short as possible.

FIG. 18B is a drawing showing switching of imaging drive mode from the state where live view display is being performed, when the 1st release is pressed down and there is a switch to AF exposure. In a state where live view display is being performed (T31) without the user operating the release button, if time T31a is reached the user presses the release button down halfway and the 1st release switch is turned on. The CPU 212 detects the 1st release being turned on.

At time T32, the image sensor 208 performs readout of pixel values for live view display. Readout of pixel values is also being performed at time T33, but in response to the 1st release switch being on the CPU 212 issues an imaging drive mode switching command to the image sensor 208 at this time. Specifically, the CPU 212 issues a command to the image sensor 208 to switch from pixel signal for live view display generating mode to an imaging drive mode in which pixel signal generation for phase difference detection and generation of a pixel signal for live view (for display) are alternately executed. The element control section 29 of the image sensor 208 receives this switching command via the input section 28. Then, the element control section 29 controls each block within the image sensor 208 to switch from an imaging drive mode in which a pixel signal for live view display is generated to an imaging drive mode in which pixel signal generation for phase difference detection and generation of a pixel signal for live view (for display) are alternately executed. At that time, in the imaging drive mode in which pixel signal generation for phase difference detection and generation of a pixel signal for live view (for display) are alternately executed, the CPU 212 issues a command to the image sensor 208 so as to execute an initial pixel signal for still phase difference detection generation operation.

At time T23 in FIG. 18A, there is a switch from pixel value for live view display readout to pixel value for phase difference detection readout. As a result of this, pixel values at time T33 are treated as pixel values of an invalid frame. Then, readout is alternately performed for pixel values of a phase difference frame at time T34, and pixel values for a display frame time T35. After that also, while the 1st release is on, pixel values for phase difference frames and pixel values for display frames are alternately output from the image sensor 208, and are respectively read out and processed by the focus detection circuit 218 and the image processing circuit 214.

In this way, it is ensured that an initial valid frame after the 1st release has been pressed down constitutes a frame for phase difference detection. As a result, since the initial valid frame constitutes a phase difference detection frame, it is possible to make the time to commencement of AF as short as possible.

As has been described above, with the one embodiment of the present invention, pixel signals are alternately read out from the image sensor during continuous AF with rapid shooting. With this alternate read out, readout for still picture exposure and readout from photodiodes that have been divided for focus detection (PD divided exposure) are performed alternately. Specifically, a first imaging operation, in which pixel signals corresponding to pupil division direction are combined and a pixel signal for storage is generated, and a second imaging operation in which pixel signal corresponding to a pupil division direction are generated, are alternately performed. This means that there is no degradation in a still image, and moreover, is also possible to perform accurate focus detection.

Also, with the one embodiment of the present invention, readout from photodiodes that have been divided for focus detection (PD divided exposure) involves reading out of both photodiodes for one side openings (for example, left openings, top openings) and photodiodes for the other side openings (for example, right openings, bottom openings) (refer, for example, to FIG. 5 and FIG. 6, and first readout in FIG. 14 and FIG. 15). This means that it is possible to obtain accurate output of respective photodiodes for one side opening on the other side opening, and it is possible to increase focus detection precision.

Also, with the one embodiment of the present invention, readout from photodiodes that have been divided for focus detection (PD divided exposure) involves reading out of either one of photodiodes for one side openings (for example, left openings, top openings) or photodiodes for the other side openings (for example, right openings, bottom openings) (refer, for example, to FIG. 7 to FIG. 9, FIG. 14, and second readout in FIG. 16 and FIG. 17). Since only either one of the photodiodes is read out, it is possible to expect shortening of readout time.

Also, with the one embodiment of the present invention, at the time of 2nd release there is a switch to an imaging mode where pixel signals are alternately read out from the image sensor. For an initial frame at the time of switching an imaging operation is performed for still picture exposure. As a result it is possible to shorten time lag until still picture shooting.

It should be noted that with the one embodiment of the present invention, some or all of the focus detection circuit 218, image processing circuit 214, image compression and expansion section 216, exposure control circuit 220 etc. may be integrated with the CPU 212 and the peripheral circuitry of the CPU. It is also possible for the focus detection circuit 218, image processing circuit 214, image compression and expansion section 216, exposure control circuit 220 etc. to have a hardware structure such as gate circuits that have been generated based on a programming language that is described using Verilog, and also to use a hardware structure that utilizes software such as a DSP (digital signal processor). Suitable combinations of these approaches may also be used.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to apply the present invention as long as a device is for shooting that, when performing exposure for storage, also performs exposure for focus detection.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus detection device comprising:
an image sensor including
a plurality of photo-diodes arranged divided in a specified pupil division direction, so that a pixel signal is generated by subjecting respective light flux, that passes through different exit pupil regions of an imaging optical system for a single micro-lens, to photoelectric conversion, and
an imaging control circuit that implements a selected one of a first imaging mode and a second imaging mode, the first imaging mode for alternately and repeatedly executing a first imaging operation and a second imaging operation, wherein
the first imaging operation combines pixel signals corresponding to the specified pupil division direction and generates and outputs a pixel signal for storage, and
the second imaging operation generates and outputs a pixel signal corresponding to the specified pupil division direction, for focus detection, and
the second imaging mode for performing a third imaging operation in which pixel signals corresponding to the specified pupil-division direction are combined and a pixel signal for display is generated and output;
an image processing circuit that, when the image sensor is executing the first imaging operation, performs processing to store still image data based on pixel signals output from the image sensor;
a focus detection circuit that, when the image sensor is executing the second imaging operation, performs processing for focus detection based on pixel signals output from the image sensor; and
a control circuit that selects and sets the first imaging mode for alternately and repeatedly executing the first imaging operation and the second imaging operation, in the image sensor, responsive to a determination that still picture shooting is instructed when the image sensor is repeatedly executing an imaging operation in the second imaging mode, and
that instructs the image sensor to execute the first imaging operation before the second imaging operation in the first imaging mode.

2. The focus detection device of claim 1, wherein:
the second imaging operation only outputs a pixel signal corresponding to pupil division directions of some among the plurality of photo-diodes.

3. The focus detection device of claim 1, wherein:
the second imaging operation outputs pixel signals corresponding to pupil division directions of all of the plurality of photo-diodes.

4. A focus detection device, comprising:
an image sensor including
a plurality of photo-diodes arranged divided in a specified pupil division direction, so that a pixel signal is generated by subjecting respective light flux, that passes through different exit pupil regions of an imaging optical system for a single micro-lens, to photoelectric conversion; and
an imaging control circuit that implements a selected one of a first imaging mode and a third imaging mode, the first imaging mode for alternately and repeatedly executing a first imaging operation and a second imaging operation, wherein
the first imaging operation combines pixel signals corresponding to the specified pupil division direction and generates and outputs a pixel signal for storage, and
the second imaging operation generates and outputs a pixel signal corresponding to the specified pupil division direction, for focus detection, and
the third imaging mode for sequentially executing the second imaging operation and a third imaging operation of combining pixel signals corresponding to the specified pupil-division direction, and creating and outputting a pixel signal for display;
an image processing circuit that, when the image sensor is executing the first imaging operation, performs processing to store still image data based on pixel signals output from the image sensor;
a focus detection circuit that, when the image sensor is executing the second imaging operation, performs processing for focus detection based on pixel signals output from the image sensor; and
a control circuit sets the first imaging mode, in the image sensor, for alternately and repeatedly executing the first imaging operation and the second imaging operation, in the image sensor responsive to a determination that still picture shooting is instructed when the image sensor is repeatedly executing an imaging operation in the third imaging mode.

5. A focus detection method, for a focus detection device having an image sensor with a plurality of photo-diodes, arranged divided in a given pupil division direction, that generate a pixel signal by subjecting respective light flux, that passes through different exit pupil regions of an optical system for a single micro-lens, to photoelectric conversion,
the image sensor having a first imaging mode and a second imaging mode,
the first imaging mode alternately and repeatedly executing (1) a first imaging operation, performing processing to store still image data based on pixel signals output from the image sensor and (2)
a second imaging operation, performing processing for focus detection based on pixel signals output from the image sensor, and
the second imaging mode executing a third imaging operation in which pixel signals corresponding to the pupil-division direction are combined and a pixel signal for display is generated and output, the focus detection method comprising:
setting the image sensor to the first imaging mode, for alternately and repeatedly executing the first imaging operation and the second imaging operation; and
setting the image sensor to the first imaging mode, for alternately and repeatedly executing the first imaging operation and the second imaging operation, responsive to a determination that still picture shooting is instructed when the image sensor is repeatedly executing an imaging operation in the second imaging mode,
wherein, when the image sensor is set to the first imaging mode to alternately and repeatedly execute the first imaging operation and the second imaging operation, the image sensor is instructed such that the first imaging operation is executed before the second imaging operation.

6. The focus detection method of claim 5, wherein:
the second imaging operation only outputs a pixel signal corresponding to some pupil division directions of among the plurality of photo-diodes.

7. The focus detection method of claim 5, wherein:
the second imaging operation outputs pixel signals corresponding to pupil divisions direction of all of the plurality of photo-diodes.

8. A focus detection method, for a focus detection device having an image sensor with a plurality of photo-diodes, arranged divided in a given pupil division direction, that generate a pixel signal by subjecting respective light flux, that passes through different exit pupil regions of an optical system for a single micro-lens, to photoelectric conversion, the image sensor having a first imaging mode, a second imaging mode, and a third imaging mode,
the first imaging mode for alternately and repeatedly executing (1) a first imaging operation, processing to store still image data based on pixel signals output from the image sensor, and (2) a second imaging operation, processing for focus detection based on pixel signals output from the image sensor,
the second imaging mode executing a third imaging operation in which pixel signals corresponding to the given pupil division direction are combined and a pixel signal for display is generated and output, and
the third imaging mode sequentially executing (1) the third imaging operation and (2) the second imaging operation, the focus detection method comprising:
setting the first imaging mode, for alternately and repeatedly executing the first imaging operation and the second imaging operation, in the image sensor responsive to a determination that still picture shooting is instructed when the image sensor is repeatedly executing an imaging operation in the second imaging mode;
setting, the third imaging mode in the image sensor, for sequentially executing the third imaging operation and the second imaging operation; and
setting the first imaging mode, for alternately and repeatedly executing the first imaging operation and the second imaging operation, in the image sensor responsive to a determination that still picture shooting is instructed when the image sensor is repeatedly executing an imaging operation in the third imaging mode.

9. The focus detection method of claim 8, wherein:
in a case where the first imaging mode has been set whereby the first imaging operation and the second imaging operation are alternately and repeatedly executed, the first imaging operation in executed before the second imaging operation.

10. A non-transitory computer-readable medium storing a processor executable code, which when executed by at least one processor, performs a focus adjusting method, the processor being arranged within a focus detection device having an image sensor with a plurality of photo-diodes, arranged divided in a given pupil division direction, that generate a pixel signal by subjecting respective light flux, that passes through different exit pupil regions of
an optical system for a single micro-lens, to photoelectric conversion,
an optical system for a single micro-lens, to photoelectric conversion,
the image sensor having a first imaging mode and a second imaging mode,
the first imaging mode alternately and repeatedly executing (1) a first imaging operation, performing processing to store still image data based on pixel signals output from the image sensor and (2)
a second imaging operation, performing processing for focus detection based on pixel signals output from the image sensor, and
the second imaging mode executing a third imaging operation in which pixel signals corresponding to the pupil-division direction are combined and a pixel signal for display is generated and output, the focus detection method comprising:
setting the image sensor to the first imaging mode, for alternately and repeatedly executing the first imaging operation and the second imaging operation; and
setting the image sensor to the first imaging mode, for alternately and repeatedly executing the first imaging operation and the second imaging operation, responsive to a determination that still picture shooting is instructed when the image sensor is repeatedly executing an imaging operation in the second imaging mode,
wherein, when the image sensor is set to the first imaging mode to alternately and repeatedly execute the first imaging operation and the second imaging operation, the image sensor is instructed such that the first imaging operation is executed before the second imaging operation.

11. The non-transitory computer-readable medium of claim 10, wherein:
the second imaging operation only outputs a pixel signal corresponding to some pupil division directions of among the plurality of photo-diodes.

12. The non-transitory computer-readable medium of claim 10, wherein:
the second imaging operation outputs pixel signals corresponding to pupil divisions direction of all of the plurality of photo-diodes.

13. A non-transitory computer-readable medium storing a processor executable code, which when executed by at least one processor, performs a focus adjusting method, for a focus detection device having an image sensor with a plurality of photo-diodes, arranged divided in a given pupil division direction, that generate a pixel signal by subjecting respective light flux, that passes through different exit pupil regions of an optical system for a single micro-lens, to photoelectric conversion, the image sensor having a first imaging mode, a second imaging mode, and a third imaging mode,
the first imaging mode for alternately and repeatedly executing (1) a first imaging operation, processing to store still image data based on pixel signals output from the image sensor, and (2) a second imaging operation, processing for focus detection based on pixel signals output from the image sensor,
the second imaging mode executing a third imaging operation in which pixel signals corresponding to the given pupil division direction are combined and a pixel signal for display is generated and output, and
the third imaging mode for successively executing (1) the second imaging operation and (2) the third imaging operation, and the focus adjustment method comprising:
setting the first imaging mode, for alternately and repeatedly executing the first imaging operation and the second imaging operation, in the image sensor responsive to a determination that still picture shooting is instructed when the image sensor is repeatedly executing an imaging operation in the second imaging mode;
setting, the third imaging mode in the image sensor, for sequentially executing the second imaging operation and the third imaging operation; and
setting the first imaging mode, for alternately and repeatedly executing the first imaging operation and the second imaging operation, in the image sensor responsive to a determination that still picture shooting is instructed when the image sensor is repeatedly executing an imaging operation in the third imaging mode.

14. The focus detection device of claim 4, wherein:
the control circuit instructs the image sensor so as to execute the first imaging operation before the second imaging operation, in the first imaging mode.

15. The focus detection device of claim 1, wherein:
the image sensor outputs some pixel signals, among pixel signals corresponding to the specified pupil-division direction, with the second imaging operation of the first imaging mode.

16. The focus detection device of claim 15, wherein:
the focus detection circuit performs processing for focus detection using a pixel signal generated by the first imaging operation of the first imaging mode, and said some pixel signals.

17. The focus detection device of claim 4, wherein:
the image sensor outputs some pixel signals, among pixel signals corresponding to the pupil-division direction, with the second imaging operation of the first imaging mode.

18. The focus detection device of claim 17, wherein:
the focus detection circuit performs processing for focus detection using a pixel signal generated by the first imaging operation of the first imaging mode, and said some pixel signals.

* * * * *